US006947647B2

(12) United States Patent
Beals et al.

(10) Patent No.: US 6,947,647 B2
(45) Date of Patent: Sep. 20, 2005

(54) METHODS FOR INSTALLING FIBER OPTIC CABLE IN A BUILDING HAVING A GAS RISER

(75) Inventors: Scott Beals, Manhattan Beach, CA (US); Kevin Leeds, Westminster, CA (US); Ron Hammer, Burbank, CA (US)

(73) Assignee: Sempra Fiber Links, San Diego, CA (US)

( * ) Notice: Subject to any disclaimer, the term of this patent is extended or adjusted under 35 U.S.C. 154(b) by 0 days.

(21) Appl. No.: 10/859,667

(22) Filed: Jun. 3, 2004

(65) Prior Publication Data

US 2004/0247264 A1 Dec. 9, 2004

Related U.S. Application Data

(60) Provisional application No. 60/475,853, filed on Jun. 4, 2003.

(51) Int. Cl.[7] .................................................. G02B 6/00
(52) U.S. Cl. ..................... 385/100; 385/134; 385/136; 385/137
(58) Field of Search ................................. 385/100, 147, 385/123, 134, 135, 136, 137; 137/318, 317, 551; 405/154.1, 155, 156, 157

(56) References Cited

U.S. PATENT DOCUMENTS

| | | | |
|---|---|---|---|
| 1,658,887 A | 2/1928 | Dotzauer | ............. 254/134.4 X |
| 4,043,537 A | 8/1977 | Russo, Jr. | ................. 254/134.4 |
| 4,856,937 A | 8/1989 | Grocott et al. | ............... 405/154 |
| 6,328,283 B1 | 12/2001 | Reeve et al. | ............. 254/134.4 |
| 6,584,252 B1 * | 6/2003 | Schier et al. | ................ 385/100 |
| 6,681,795 B2 * | 1/2004 | Beals et al. | .................. 137/318 |
| 6,736,156 B2 * | 5/2004 | Beals et al. | ............. 137/15.04 |
| 2002/0114595 A1 | 8/2002 | Potash | ......................... 385/100 |
| 2004/0247264 A1 * | 12/2004 | Beals et al. | .................. 385/100 |

FOREIGN PATENT DOCUMENTS

| | | | |
|---|---|---|---|
| EP | 0 785 387 A1 | 7/1997 | ............. 385/100 X |
| EP | 0 795 942 B1 | 8/2000 | ............. 385/100 X |

* cited by examiner

*Primary Examiner*—Brian M. Healy
(74) *Attorney, Agent, or Firm*—Perkins Coie LLP

(57) ABSTRACT

A method for installing a fiber optic cable in a building having a gas riser includes the steps of routing a first translating member from a riser entry location, through the riser, and out a riser exit location. A fiber optic cable near the riser exit location is engaged by the first translating member, and is retracted into the riser past a branch in the riser, so the fiber optic cable hangs down past the branch. A second translating member is routed from a branch entry location, through the branch, and into the riser. The fiber optic cable is engaged by the second translating member, and the first translating member is disengaged from the fiber optic cable. The second translating member, along with the fiber optic cable, is retracted through the branch and out the branch entry location. The fiber optic cable may then be connected to an end-user system.

25 Claims, 26 Drawing Sheets

METHODS FOR INSTALLING FIBER OPTIC CABLE IN A BUILDING HAVING A GAS RISER

This application claims priority to U.S. Provisional Application Ser. No. 60/475,853, filed Jun. 4, 2003, which is hereby incorporated by reference.

BACKGROUND OF THE INVENTION

With the advent of more powerful computing hardware and software applications, connecting optical fiber, or fiber optic cable, directly to end-user systems is becoming an increasingly important component of overall computer system speed and effectiveness. In new buildings, routing fiber optic cable is a relatively straightforward process, because the fiber optic cable can be routed during construction of the building. Accordingly, the fiber optic cable is routed before the framework of the building is completed, such that minimal physical obstruction is encountered during the installation process.

In existing buildings, especially multi-story buildings, however, routing fiber optic cable to end-users can be a very challenging process. Indeed, the cost of routing fiber optic cable to multiple end-users inside the building can be a relatively large component of the total cost of the optical fiber installation. The cost of routing optical fiber depends on a number of factors, including the distance and ease of access from a trunk fiber cable to the building interface, and the availability of fiber routing paths inside the building. For buildings that do not contain convenient raceways, plenums, or other easily accessible conduits, the cost of routing optical fiber can be prohibitive.

If such conduits are not readily accessible in an existing building, sections of the building walls typically must be removed to provide access to the desired optical fiber pathways. Removing and replacing building wall sections, however, is costly, time-consuming, messy and disruptive. Additionally, various obstructions within the walls of a building can make routing optical fiber in this manner a very lengthy, burdensome process. Accordingly, there is a need for an improved method of installing optical fiber, fiber optic cable, or conduit into an existing multi-level building, in a cost-effective, and efficient way.

SUMMARY OF THE INVENTION

The invention is directed to methods for installing fiber optic cable in a building having a gas riser. The fiber optic cable is routed through the gas riser, through one or more branches of the riser, and out one or more branch entry locations. The fiber optic cable may then be connected to end-user systems near the branch entry locations. The fiber optic cable may be routed to branches on one or more floors of the building.

In a first aspect, a method for installing a fiber optic cable in a building having a gas riser includes the steps of routing a first translating member from a riser entry location, through the riser, and out a riser exit location. A fiber optic cable near the riser exit location is engaged by the first translating member, and is retracted into the riser past a branch in the riser, so that the fiber optic cable hangs down past the branch. A second translating member is then routed from a branch entry location, through the branch, and into the riser. The fiber optic cable is engaged by the second translating member, and the first translating member is disengaged from the fiber optic cable. The second translating member, along with the fiber optic cable, is then retracted through the branch and out the branch entry location. The fiber optic cable may then be connected to an end-user system.

In a second, separate aspect of the invention, a method for installing a fiber optic cable in a building having a gas riser includes the steps of lowering a weighted first end of a fiber optic cable from a riser entry location, through the riser, past a branch in the riser, and out a riser exit location. A translating member is routed from a branch entry location, through the branch, and into the riser, where it engages the fiber optic cable. The translating member, along with the fiber optic cable, is then retracted through the branch and out the branch entry location. The fiber optic cable may then be connected to an end-user system.

In a third, separate aspect of the invention, a method for installing a fiber optic cable in a building having a gas riser includes the steps of depressurizing a section of the riser and cutting a plurality of access points into the depressurized section of the riser and at least one branch of the riser. A first translating member is then routed from a first access point in the riser, through the riser, and out a second access point in the riser. A main fiber optic cable is attached to the first translating member near the second access point. The first translating member, along with the main fiber optic cable, is retracted through the riser and out a third access point in the riser, after which the main fiber optic cable is detached from the first translating member.

The main fiber optic cable is then routed through a riser fitting and back into the riser, such that a section of the main fiber optic cable remains outside of the riser. The riser fitting is connected to the riser at the third access point. A second translating member is then routed from a fourth access point in a branch of the riser, through the branch, and out a fifth access point in the branch. A branch fiber optic cable is attached to the second translating member. The second translating member, along with a first end of the branch fiber optic cable, is then retracted through the branch and out the fourth access point. A second end of the branch fiber optic cable is coupled to the section of the main fiber optic cable that remains outside of the riser fitting. The fiber optic cable may then be connected to an end-user system.

In a fourth, separate aspect of the invention, a seal is provided at each of the riser entry location, the riser exit location, and the branch entry location, to facilitate installation of the fiber optic cable while the gas riser and the branch are pressurized.

In a fifth, separate aspect of the invention, the riser and the branch are de-pressurized before installing the fiber optic cable.

Further embodiments, including modifications, variations, and enhancements of the invention, will become apparent. The invention resides as well in sub-combinations of the features shown and described. The features shown and described relative to one embodiment or figure may also be used in other embodiments and figures.

BRIEF DESCRIPTION OF THE DRAWINGS

In the drawings, wherein the same reference number indicates the same element throughout the several views.

DETAILED DESCRIPTION OF THE DRAWINGS

The invention is directed to apparatus and methods for installing optical fibers (or similar lines, wires, fibers, tubes, conduits, innerpipes or innerducts) in the gas pipe system of a building having gas end-uses. The terms "optical fiber," "fiber unit," and "fiber optic cable," as used herein, while typically referring to a small diameter fiber cable (less than 1, or 0.75 or 0.5 or 0.25 inch) containing one or more individual optical fibers, also includes the similar lines described above.

The gas pipes or gas lines in a building provide a cost-effective passageway through which optical fibers may be routed. In order to make use of the gas pipelines, several engineering challenges must be overcome. These include how to:
1. safely and effectively seal around the fiber optic cable to prevent gas from escaping where the fiber optic cable enters or exits the gas lines;
2. use fiber optic cables and/or network design architectures that minimize capacity reduction in gas pipes;
3. use fiber optic cables that do not provide significant gas translation pathways through their internal structures;
4. use cost-effective, industry-qualified fittings that allow ingress and egress of fiber optic cable to and from the gas lines;
5. use fiber optic cable placement methods that are safe and cost-effective; and
6. use fiber optic cable placement methods that are minimally disruptive to gas customers, and are acceptable to the building and gas pipe owners.

Figure 1:
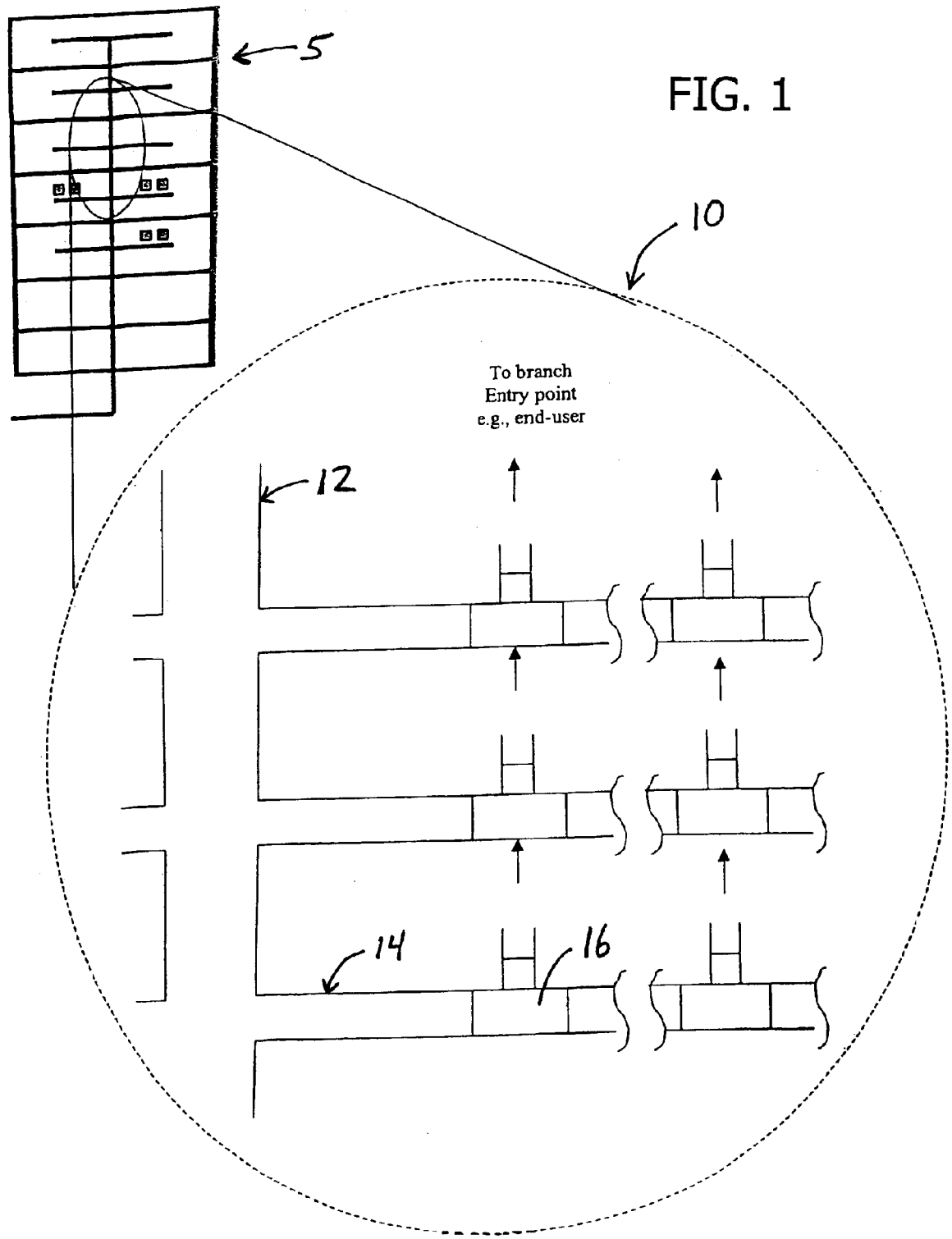
FIG. 1 is a schematic view of a section of a gas pipe system in a building.

Turning now in detail to the drawings, FIG. 1 schematically illustrates a section of a gas pipe system 10 in a building 5. The gas pipe system 10 includes a main gas line or riser 12, which typically extends vertically from the lowest floor to the highest floor of the building 5. One or more gas pipe branches 14 extend from the gas riser 12 to one or more end-user locations (not visible in the drawings), which may be natural gas appliances, such as cooking equipment, water heaters, space heaters, etc. The branches 14 may include one or more elbows 16, or similar pipeline components, leading to the end-user locations.

Figure 2:
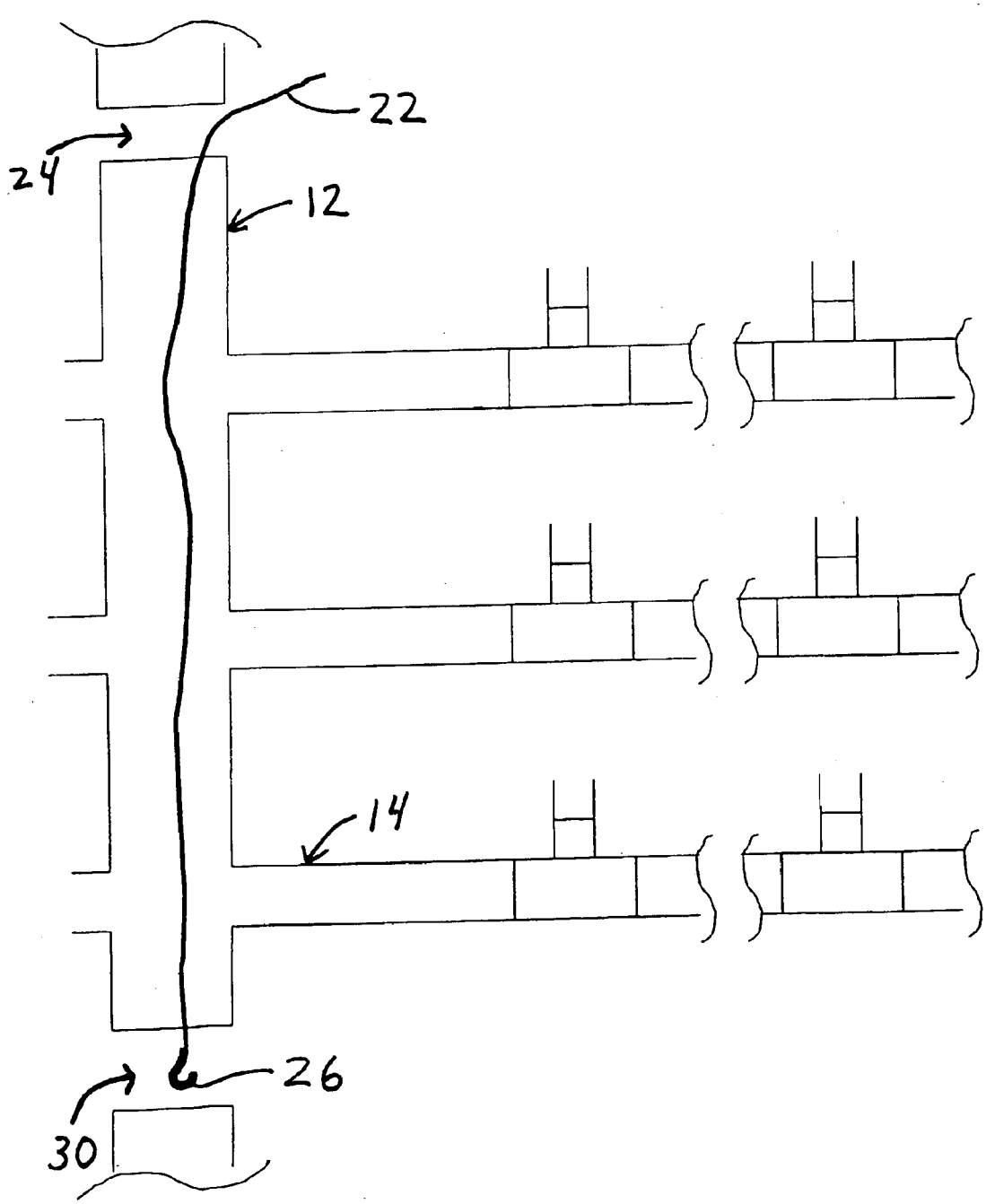
FIGS. 2–8 illustrate steps for installing a fiber optic cable in the gas pipe system shown in FIG. 1, according to a first blind coupling method.
Figure 3:
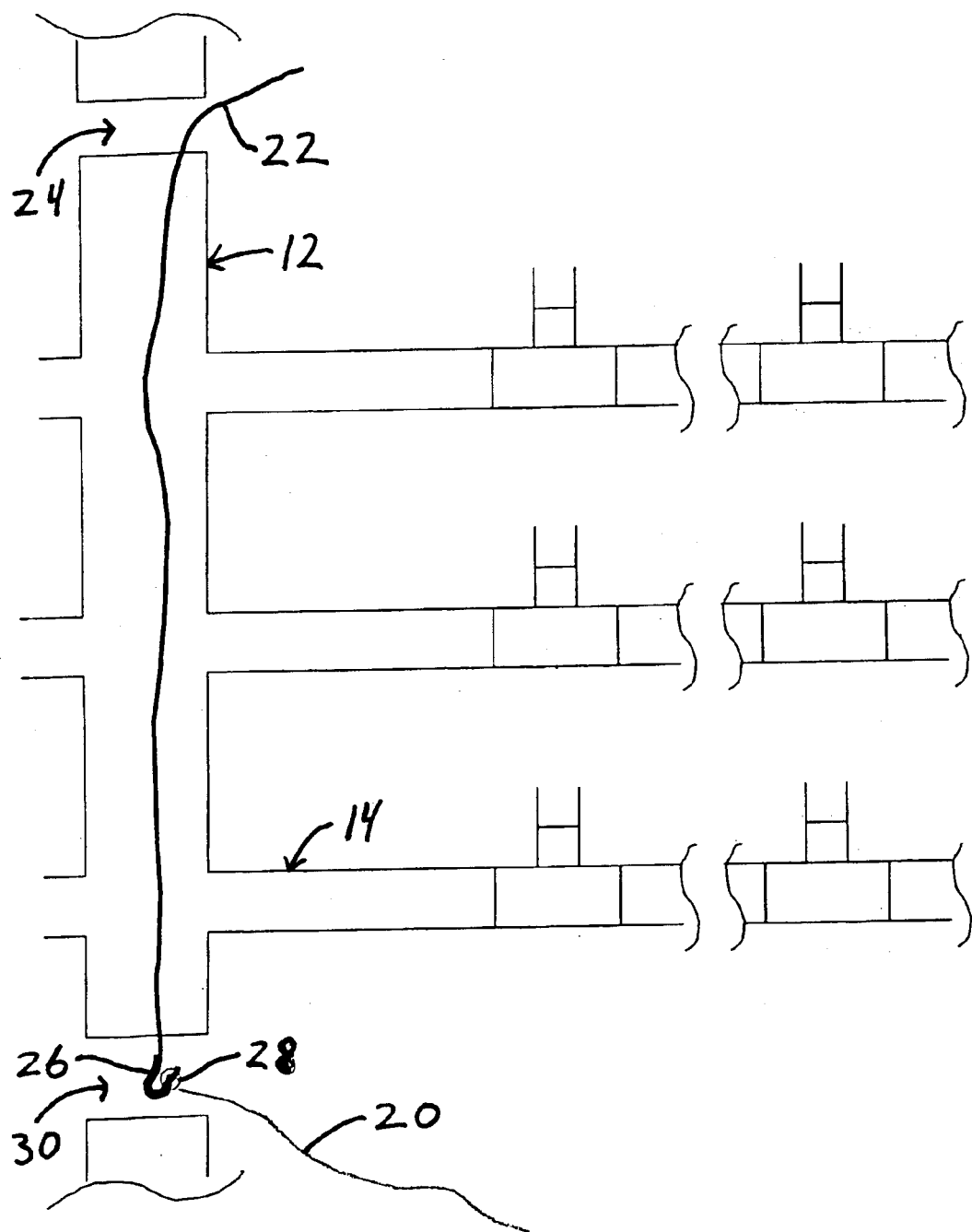

FIGS. 2–8 illustrate steps for installing one or more fiber optic cables 20 in the gas pipe system 10 of the building 5, according to a first "blind" coupling method. The installation steps described herein are preferably performed by one or more professional installers who are qualified to work on gas pipe systems. As shown in FIGS. 2 and 3, a first translating member 22, which is preferably a flexible duct rod, or metal "fish tape," is introduced into the gas riser 12 at a riser entry location 24, and is routed through the gas riser 12 and/or its branches 14. The duct rod or fish tape may have a steering end, allowing it to be steered through the gas pipelines and fittings. Pipeline vision and locating techniques may also be used. The translating member may also be a self-propelled miniature pipeline "pig", robot, or crawler, with or without an attached umbilical/pull back line. The translating member 22 is preferably fitted with an engagement means, such as a grasping hook 26 or clasp, for grasping the fiber optic cable 20. At least one end of the fiber optic cable 20 is preferably fitted with a retainer fitting, such as a hook ring 28, for engagement by the grasping hook 26 of the first translating member 22.

Figure 4:
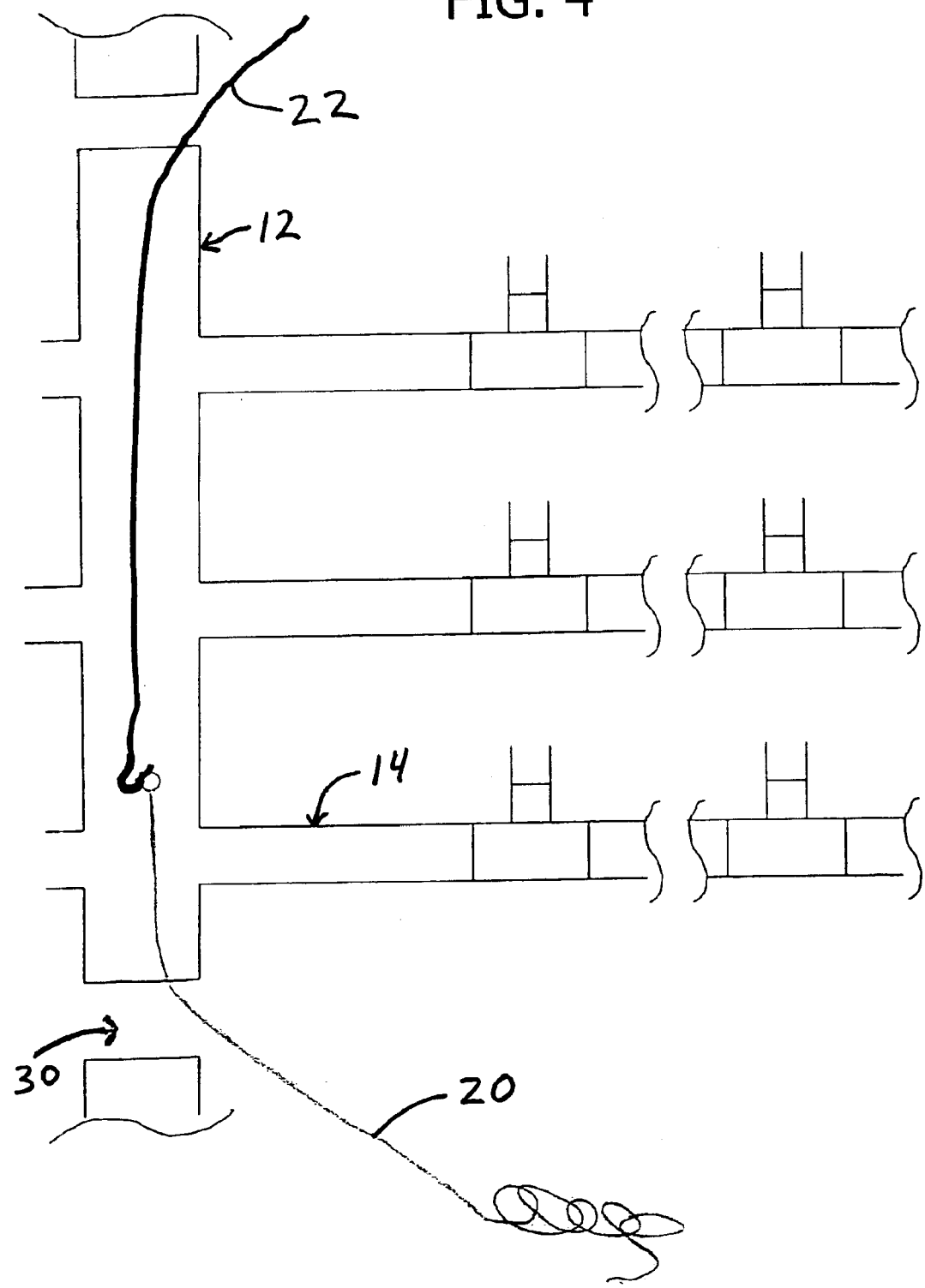

The first translating member 22 is routed through the gas riser 12 and out a riser exit location 30. The grasping hook 26 on the first translating member 22 20 engages the hook ring 28 on the fiber optic cable 20, which is preferably located near the riser exit location 30. The first translating member 22, along with the fiber optic cable 20, is then retracted into the gas riser 12 past a branch 14 in the riser 12, so that the fiber optic cable 20 hangs down past the branch 14, as shown in FIG. 4.

Figure 5:
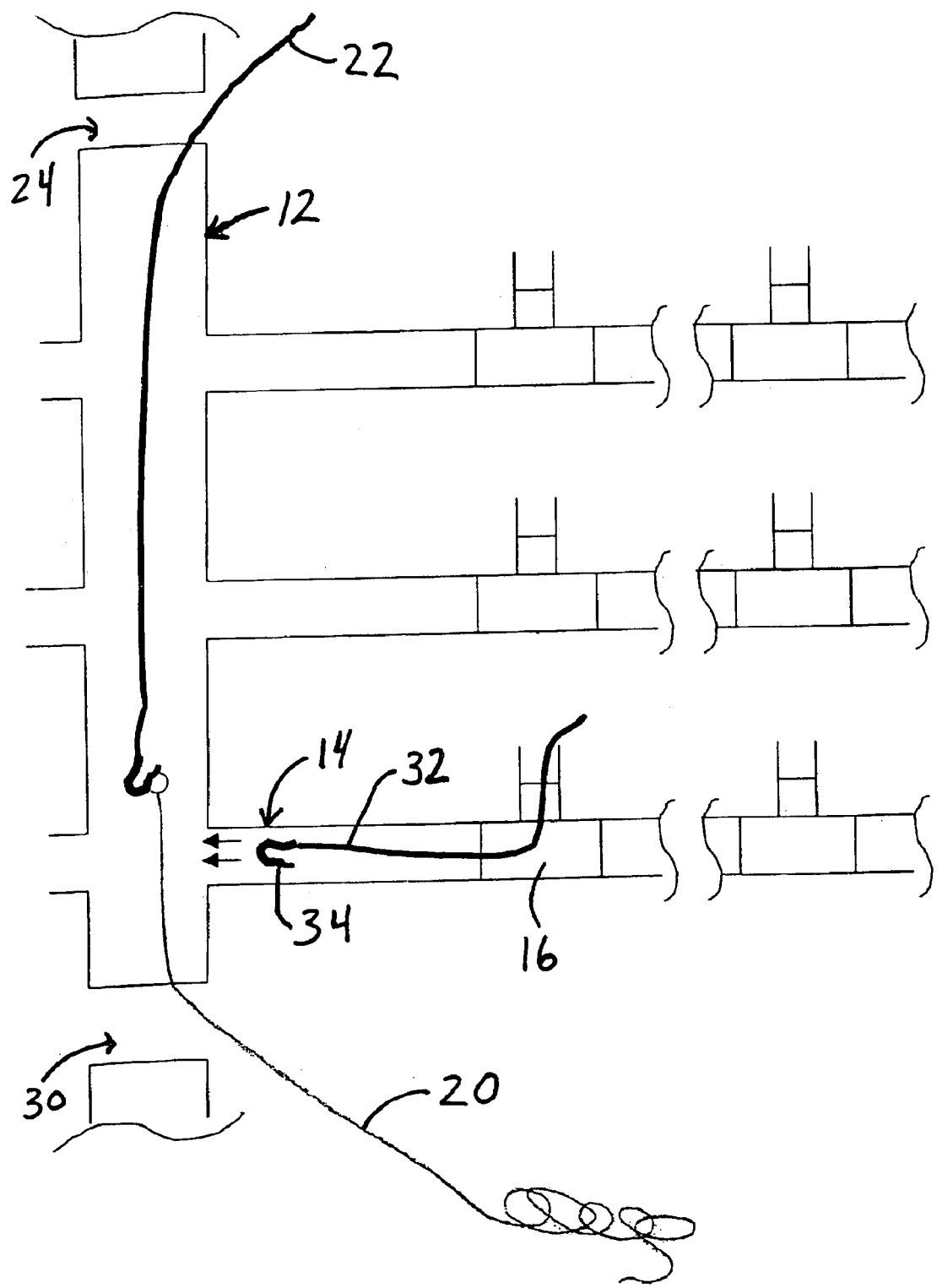

As illustrated in FIG. 5, a second translating member 32 is routed from a branch entry location, through any branch elbows 16 and the branch 14, and into the gas riser 12. The riser entry and exit locations 24, 30, and the branch entry location, may be cut into the riser 12 with a power saw or other cutting or drilling means, or may be sealable openings that allow access into the gas riser 12.

Figure 6:
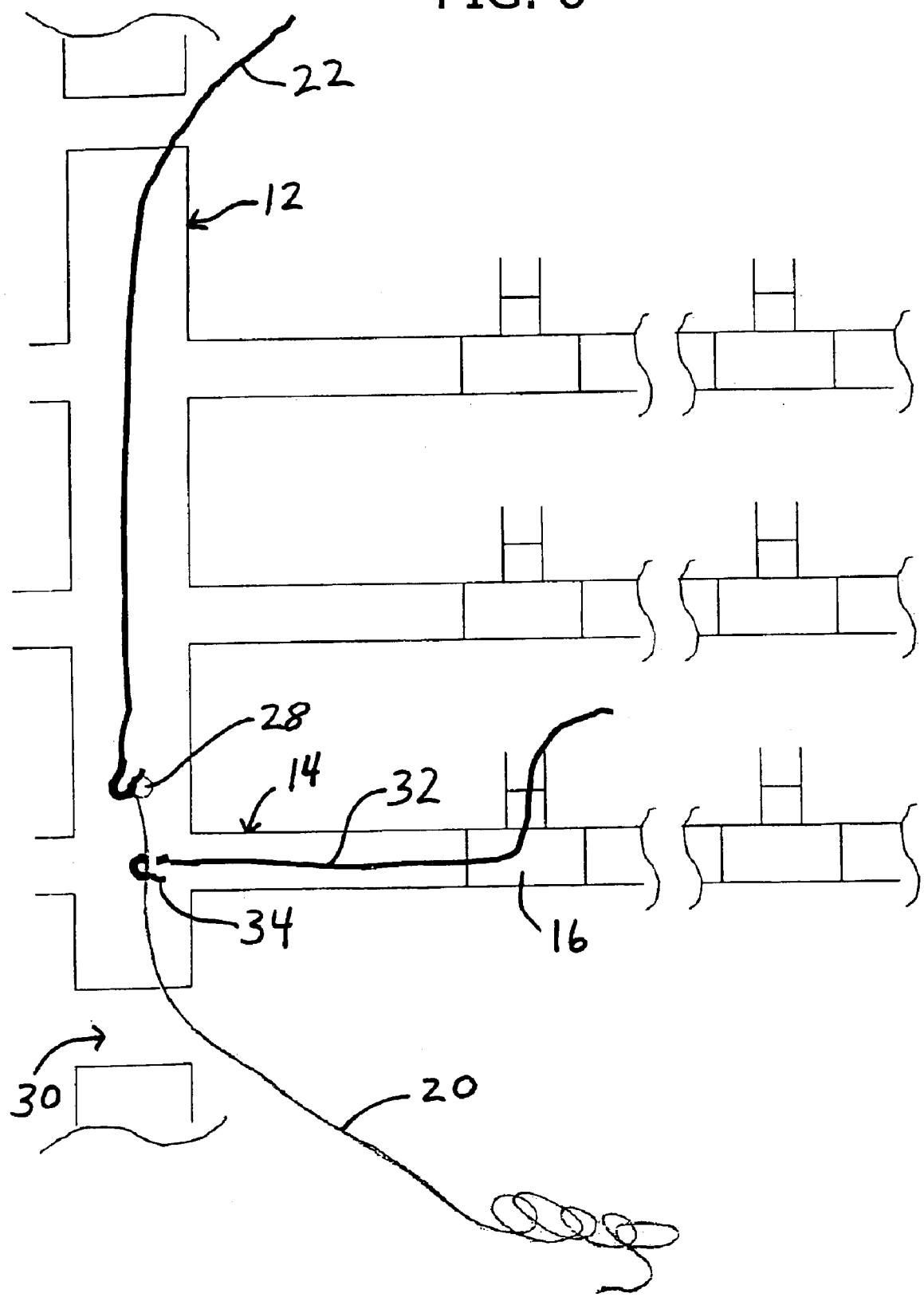
Figure 7:
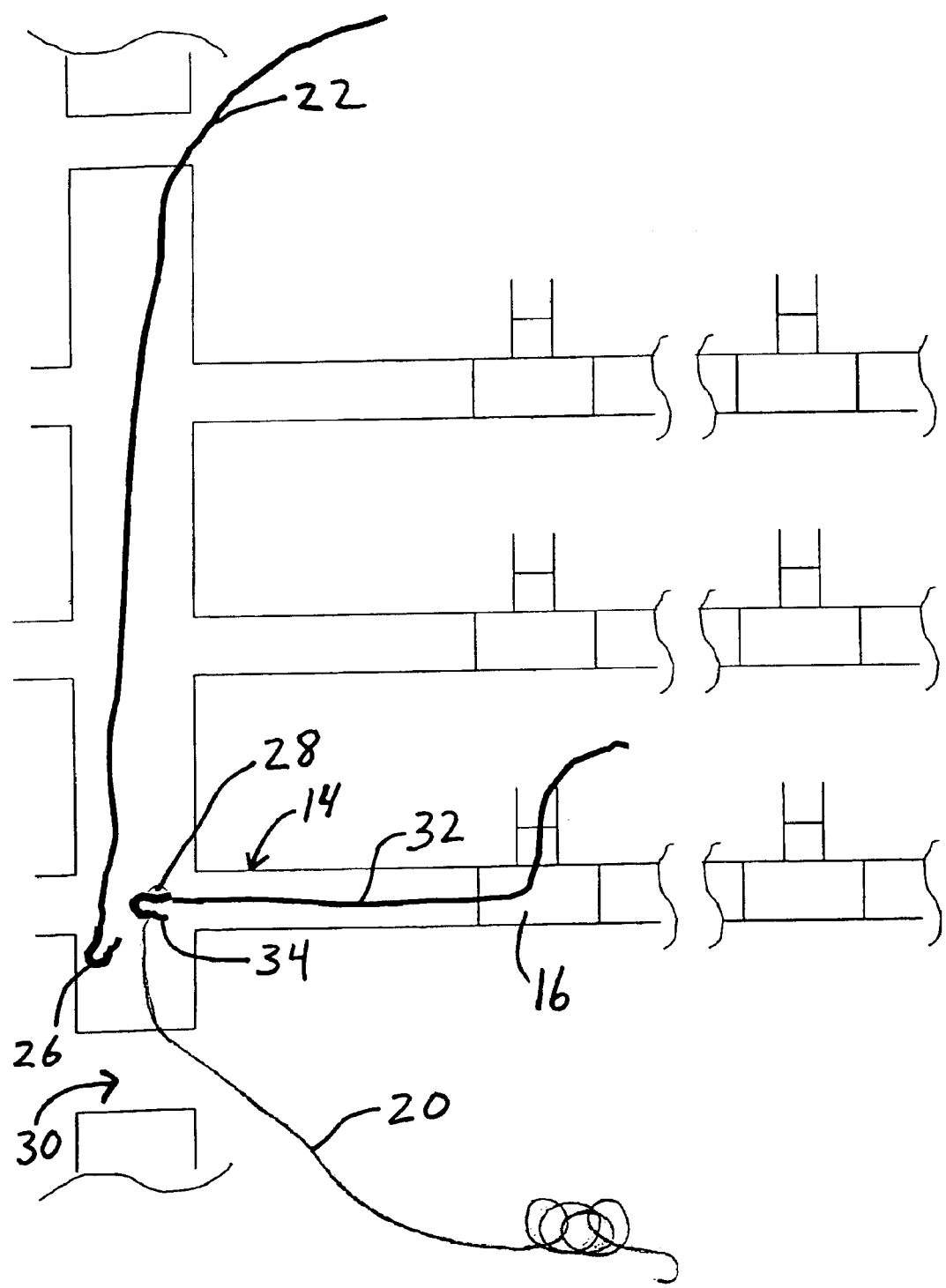
Figure 8:
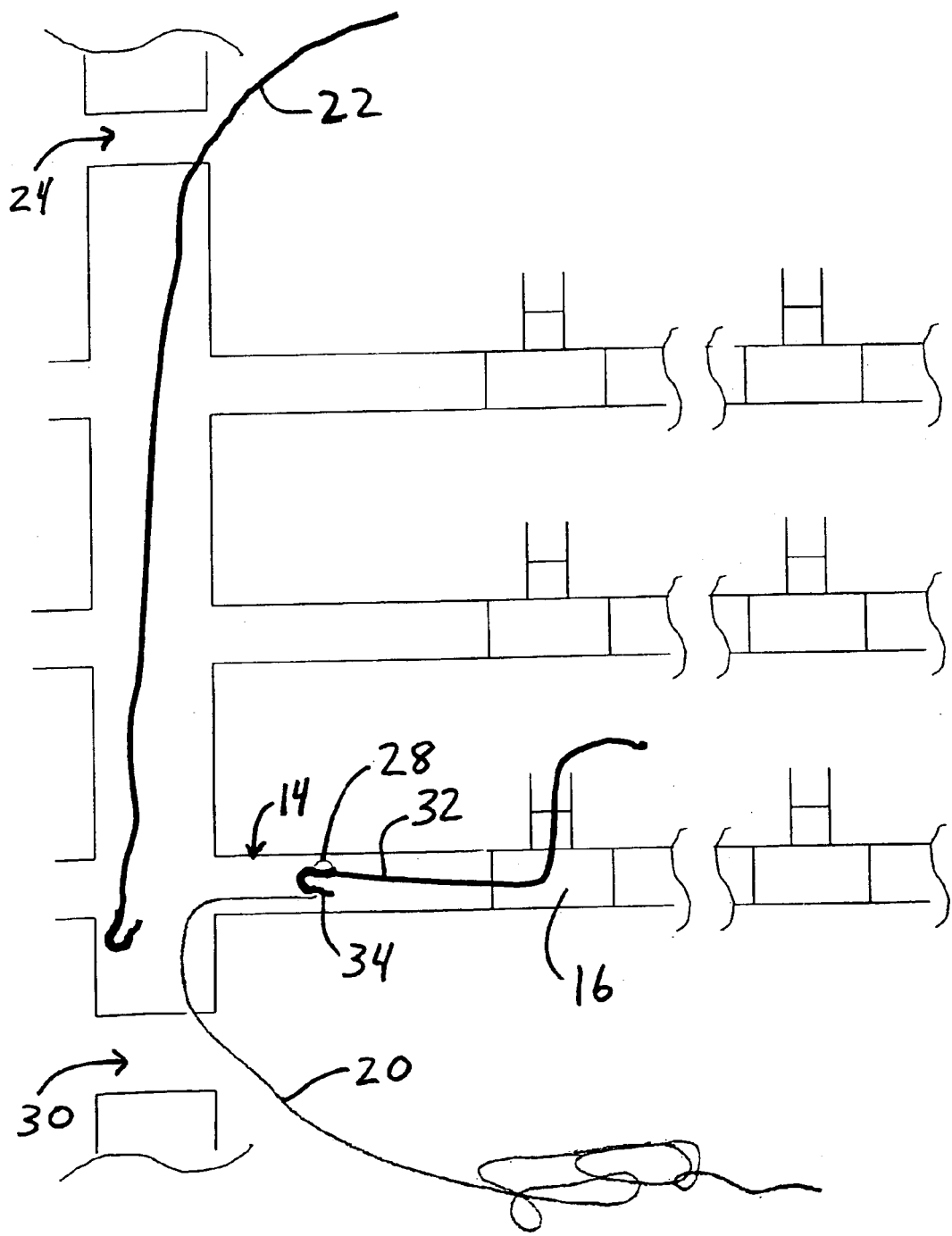

At this point, an engagement means, such as a grasping hook 34 or clasp, on the second translating member 32 engages the fiber optic cable 20, as shown in FIG. 6. The fiber optic cable 20 is then disengaged from the first translating member 22, and the grasping hook 34 on the second translating member 32 engages the hook ring 28 on the fiber optic cable 20, as shown in FIG. 7. The second translating member 32 is retracted, along with the fiber optic cable 20, through the branch 14, including any branch elbows 16, as shown in. FIG. 8, and out the branch entry location, e.g., a temporary fitting placed on a gas pipline, in the office or residential unit in the building.

The fiber optic cable 20 may then be connected to an end-user system, such as a computer system. Similar steps may be performed to install fiber optic cables 20 along additional branches of the gas riser 12, to end-user locations, on the same floor of the building 5. Additionally, fiber optic cables 20 may be installed along branches 14, to end-user locations, on one or more additional floors 20 of the building 5. When the last of the fiber optical cables 20 has been installed, any openings remaining in the gas riser 12, and/or the branches 14, are closed and sealed to prevent gas from escaping from the gas pipe system 10.

Figure 9:
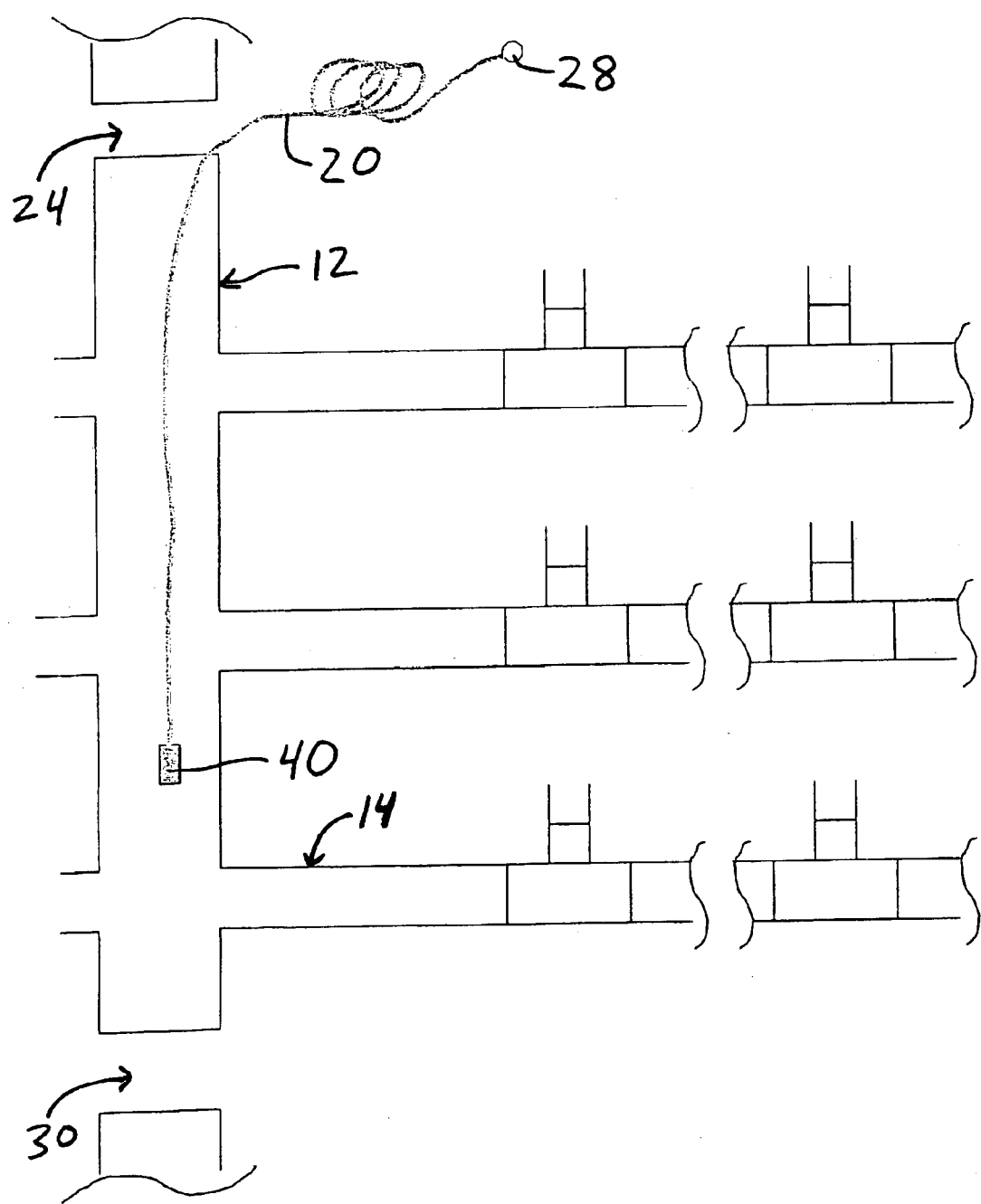
FIGS. 9–14 illustrate steps for installing a fiber optic cable in the gas pipe system shown in FIG. 1, according to a second blind coupling method.
Figure 10:
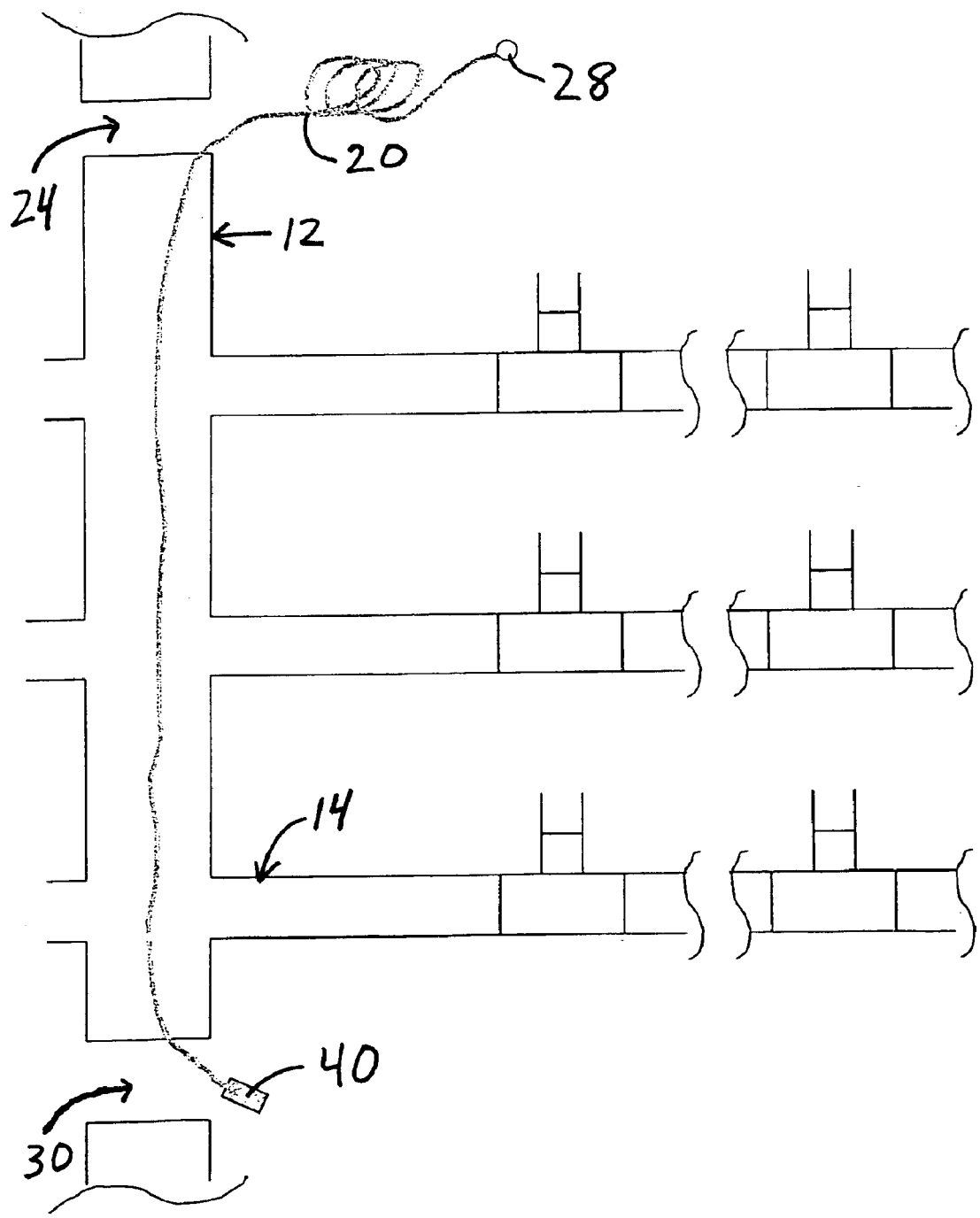

FIGS. 9–14 illustrate steps for installing one or more fiber optic cables in the gas pipe system 10 of the building 5, according to a second "blind" coupling method. A weight 40, or other heavy object, is attached to a first end of a fiber optic cable 20, which is located near the riser entry location 24. The weighted first end of the fiber optic cable 20 is lowered from the riser entry location 24, through the riser 12, and out the riser exit location 30, as shown in FIGS. 9 and 10.

Figure 11:
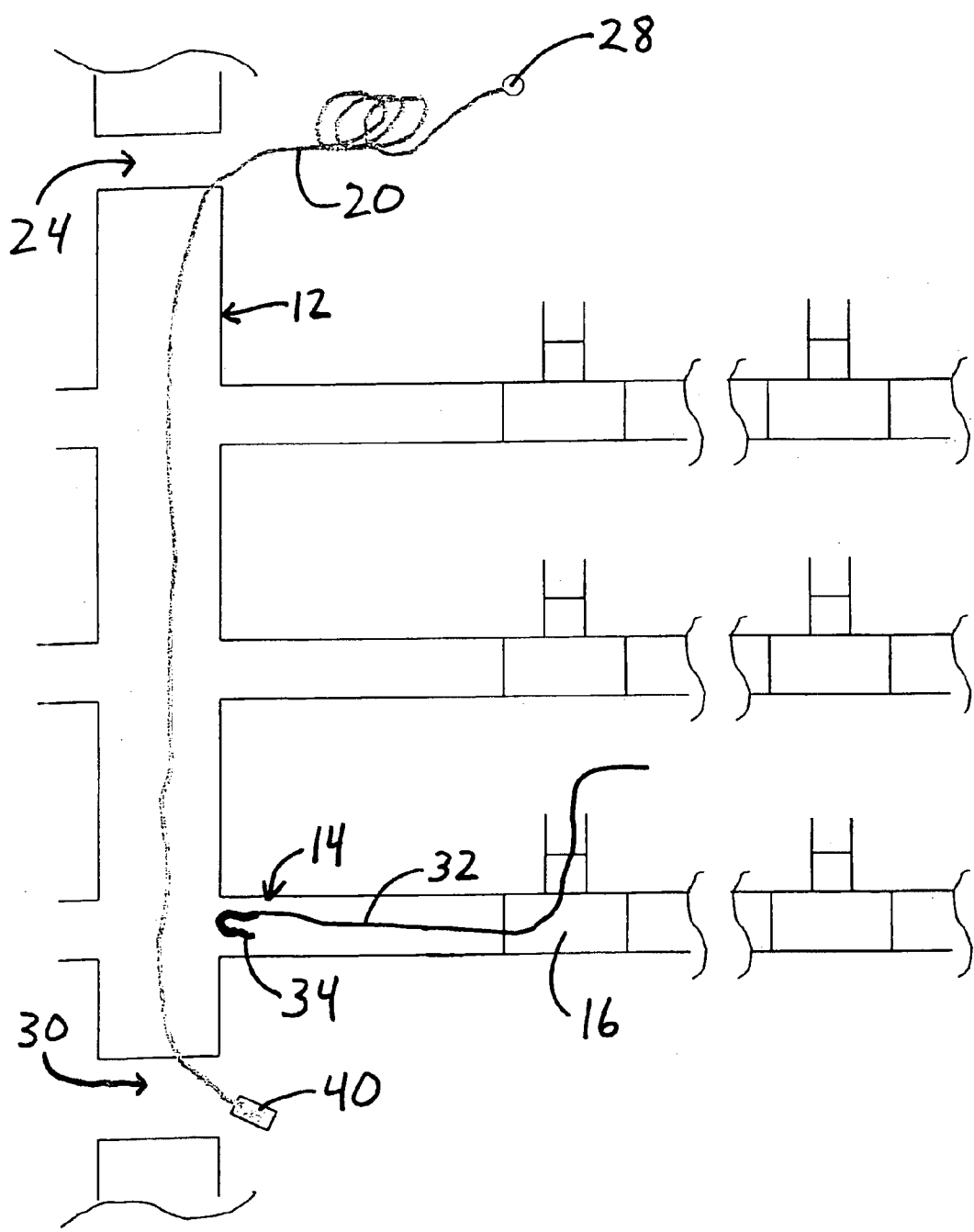
Figure 12:
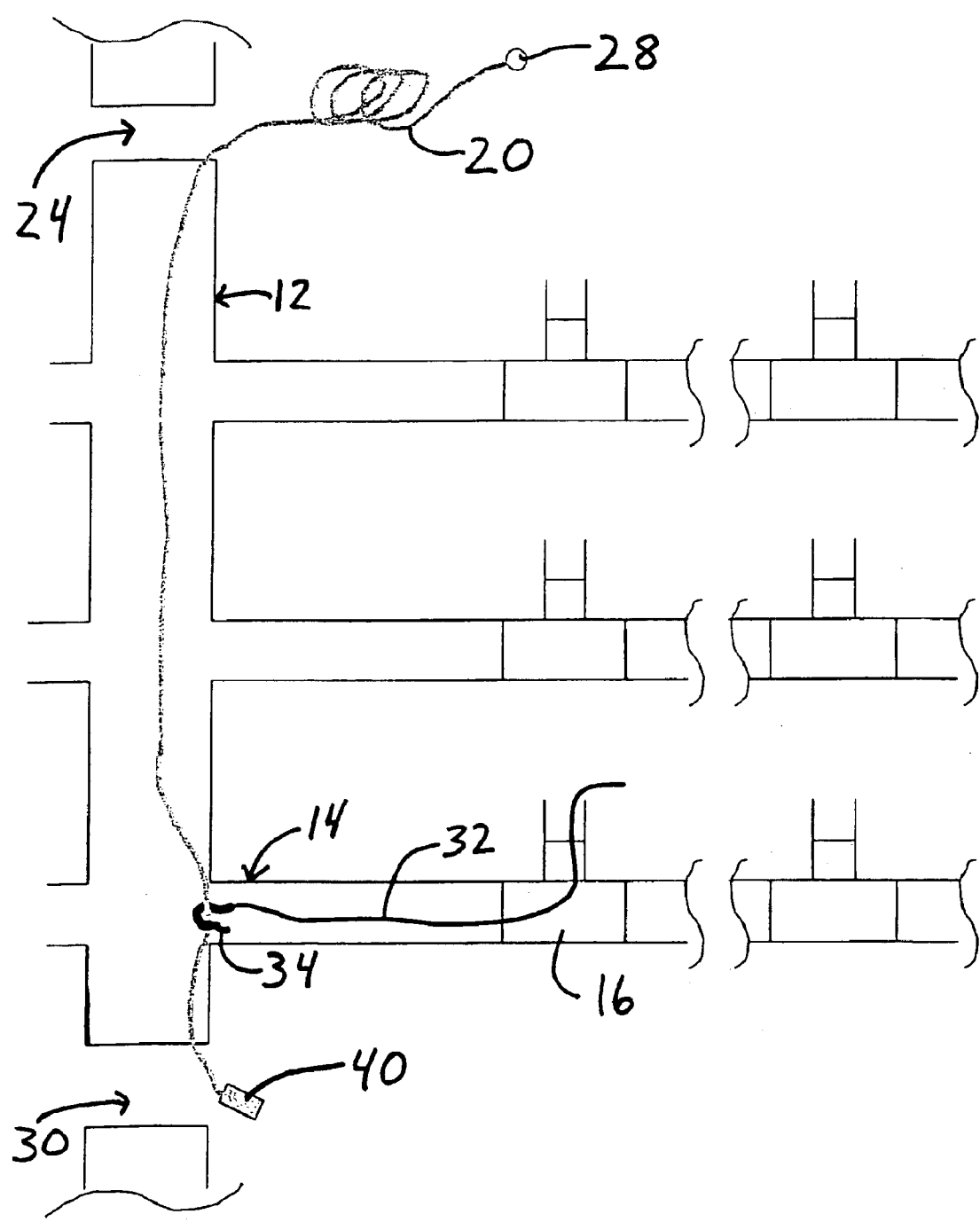
Figure 13:
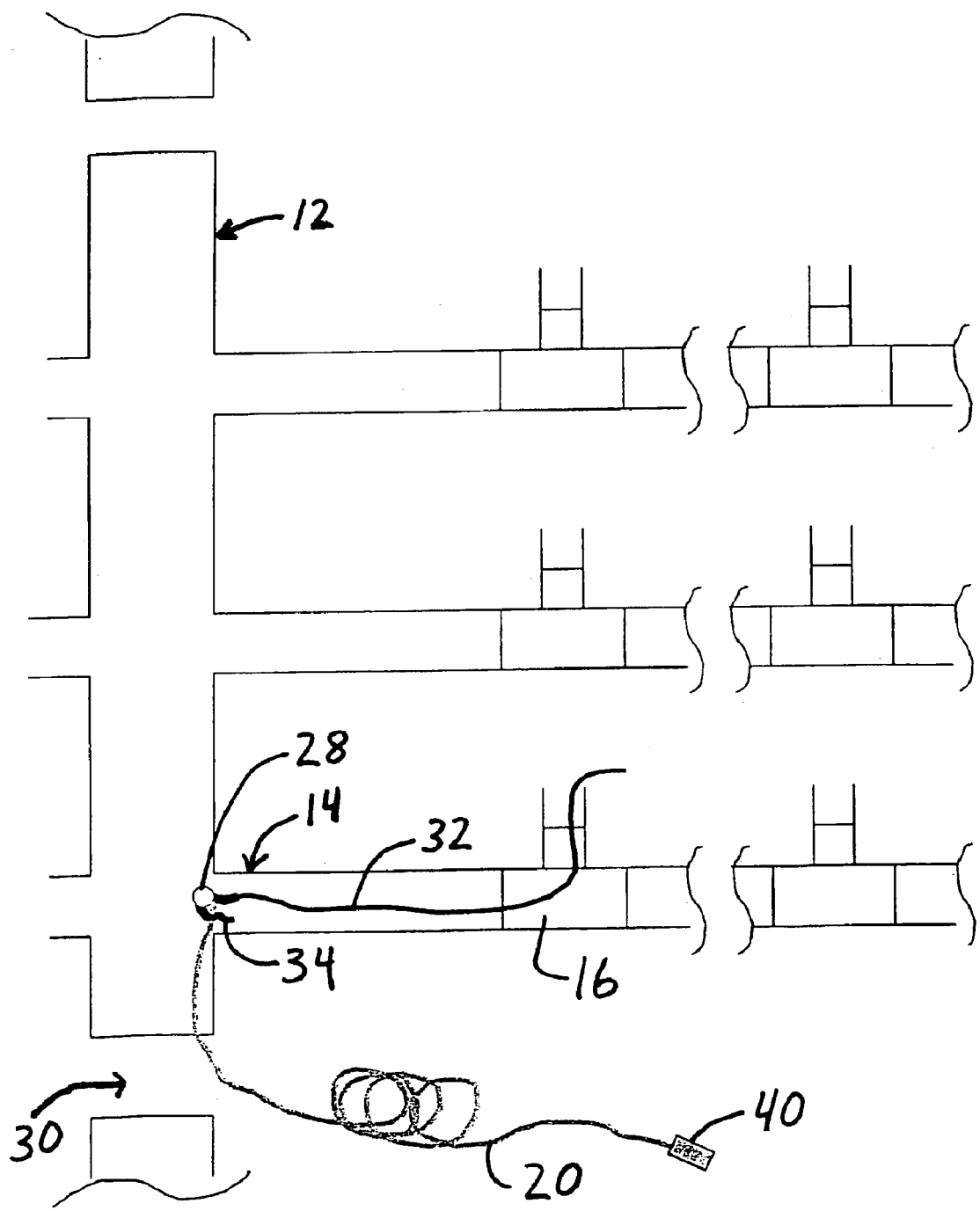

A translating member 32 is then routed from a branch entry location, through any branch elbows 16 and the branch 14, and into the gas riser 12, as shown in FIG. 11. The grasping hook 34 on the translating member 32 then engages the fiber optic cable 20, as shown in FIG. 12. At this point, the second end of the fiber optic cable 20 is preferably released into the gas riser 12. The fiber optic cable 20 is then pulled down through the riser 12, from the riser exit location 30, until the hook ring 28 (or other retainer fitting) on the second end of the fiber optic cable 20 is engaged by the grasping hook 34 on the translating member 32, as shown in FIG. 13.

Figure 14:
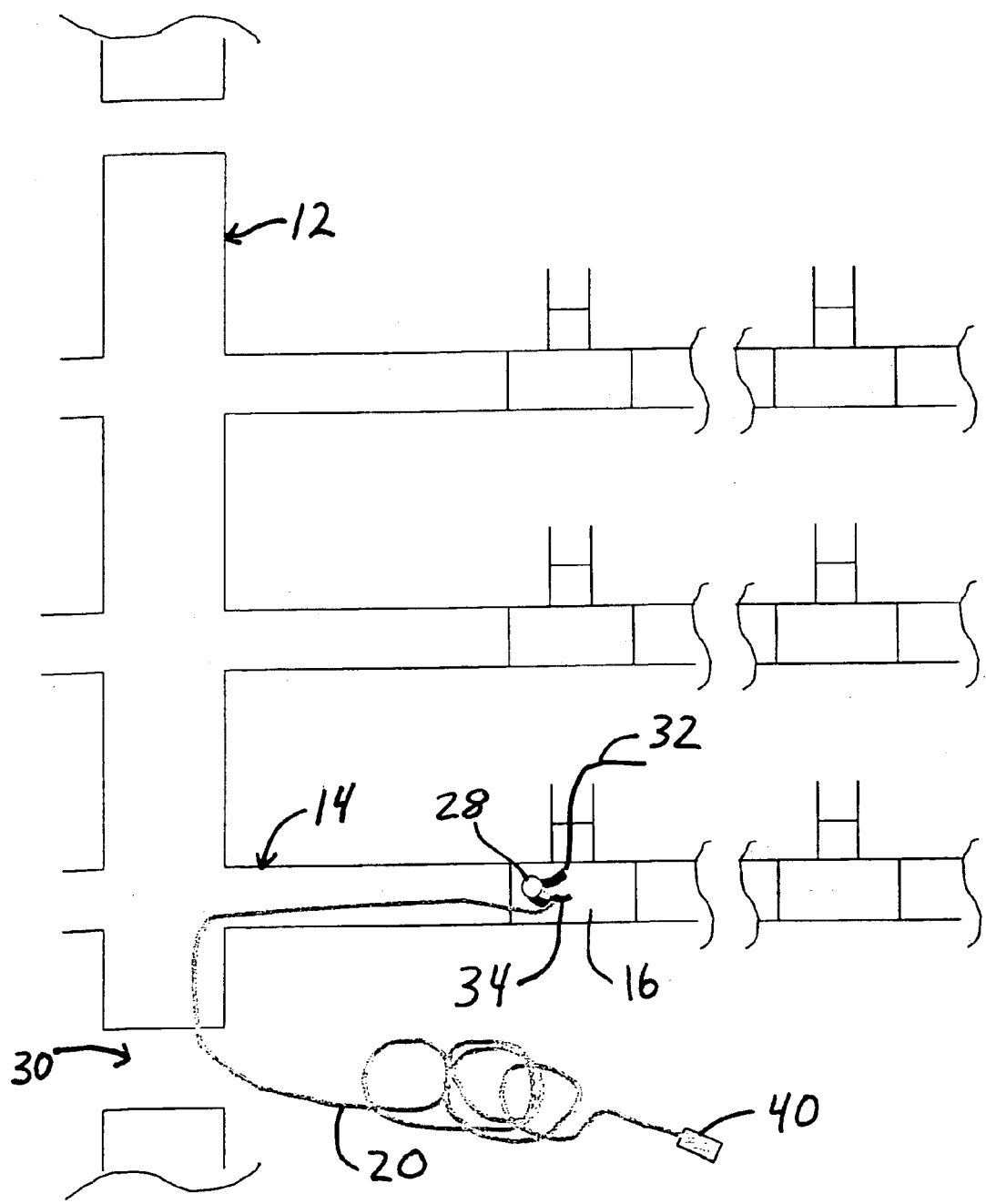

At this point, the second translating member 32 is retracted, along with the fiber optic cable 20, through the branch 14, including any branch elbows 16, as shown in. FIG. 14, and out the branch entry location. The fiber optic cable 20 may then be connected to an end-user system, such as a computer system. Similar steps may be performed to install fiber optic cables 20 along additional branches of the gas riser 12, to end-user locations, on the same floor of the building 5. Additionally, fiber optic cables 20 may be installed along branches 14, to end-user locations, on one or more additional floors of the building 5. When the last of the fiber optical cables 20 has been installed, any openings remaining in the gas riser 12, and/or the branches 14, are closed and sealed to prevent gas from escaping from the gas pipe system 10.

The two installation methods described above are referred to as "blind" coupling methods because the installers typically cannot view the fiber optic cables 20 as they are routed through the riser 12 and the branches 14 of the gas pipe system 10. These blind coupling methods may be conducted when the gas pipe system 10 is pressurized or de-pressurized. The primary advantage of performing the installation while the gas pipe system 10 remains pressurized is that customer gas service is not interrupted.

If the gas pipe system 10 remains pressurized during installation, fittings and/or seals are preferably installed at any access points in the system where gas might escape, including at the riser entry location 24, the riser exit location 30, and the branch entry location. These fittings and seals allow all aspects of the blind coupling methods to be performed without gas escaping into the building interior. Installing the fittings and seals under pressure is preferably achieved by using a temporary bypass to isolate the fitting section of the gas pipe from the gas flow, or by using "hot tap" fittings that are specially adapted to facilitate exit of the fiber optic cable through a seal. Suitable gas pipe sealing systems and methods are described in U.S. Pat. Nos. 6,536,463 and 6,681,795, both incorporated herein by reference.

When the de-pressurized method is used, the entire gas pipe system 10 may be de-pressurized before fittings and fiber optic cables are installed, or specific spans of the gas pipe system 10 may be de-pressurized while the remainder of the gas pipe system 10 is fed by a temporary gas source. The de-pressurized methods generally require less complex fittings and installation procedures than do the methods performed when the gas pipes remain pressurized, since the de-pressurized sections of the gas pipes do not require precise sealing systems to prevent gas escape.

Figure 15:
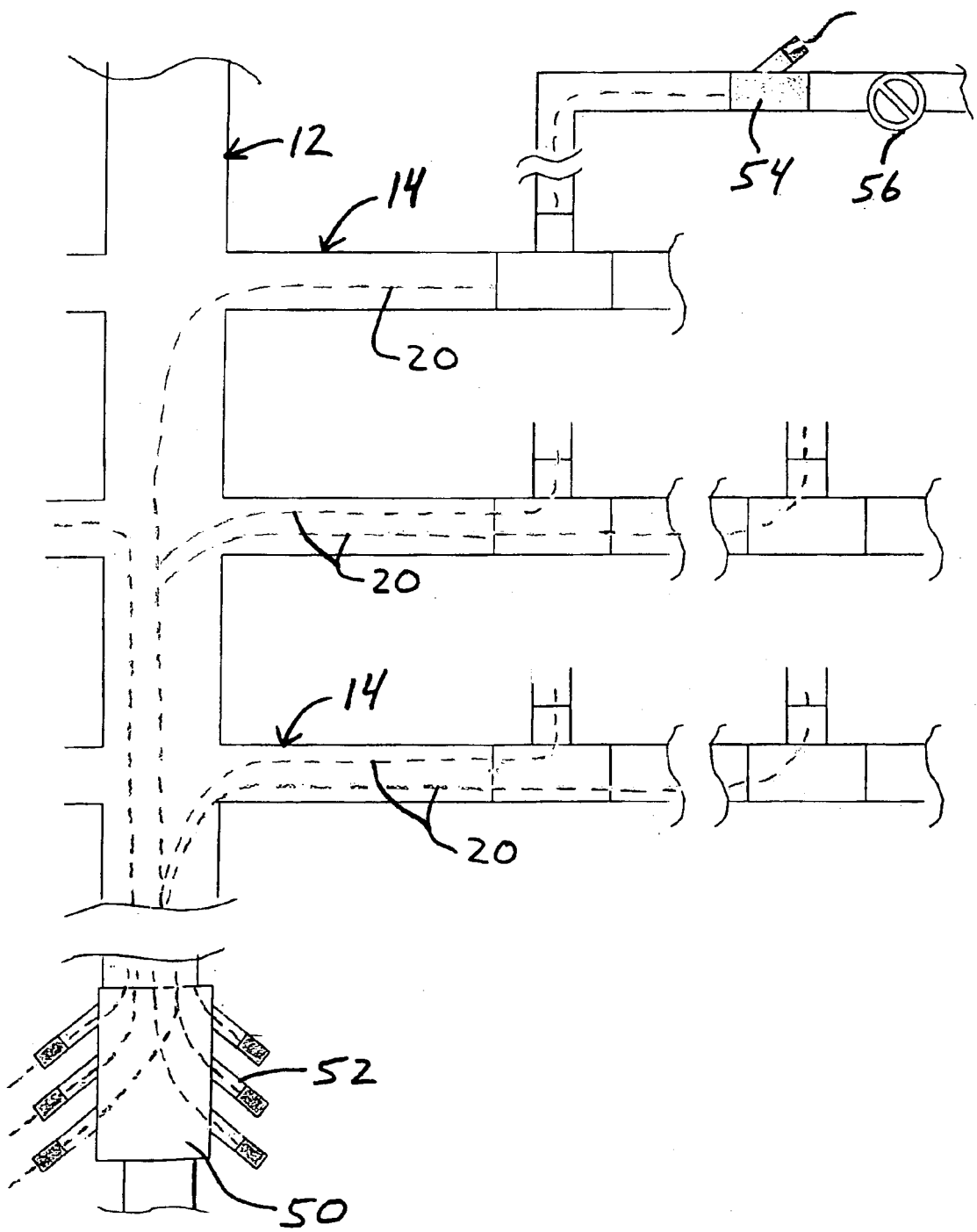
FIG. 15 is a schematic view of the gas pipe system of FIG. 1 after fiber optic cable has been installed according to the first or second blind coupling methods.

FIG. 15 is a schematic diagram of the gas pipe system 10 after several fiber optic cables 20 have been installed using one or both of the blind coupling methods described above, or variations thereof. The gas pipe system 10 preferably includes a riser manifold 50, having a plurality of entry ports 52, installed in the gas riser 12. The fiber optic cables 20 enter the gas riser 12 from outside the gas pipe system 10 through the entry ports 52. The fiber optic cables 20 are preferably sealed to the entry ports 52 so that gas does not escape from the gas pipe system 10.

As shown in FIG. 15, a fiber cable branch fitting 54 is installed at a branch entry point in a branch 14 of the gas pipe system 10. The fiber optic cable 20 is preferably sealed to the fiber cable branch fitting 54 so that gas does not escape from the gas pipe system 10 at the branch fitting 54. A similar branch fitting 54 is preferably installed at each branch entry location in the gas pipe system 10, to provide a sealed branch entry point for each fiber optic cable 20. A stopcock 56 may be located in one or more branches 14 of the gas pipe system 10 to regulate or stop the flow of gas through the branch 14. If such a stopcock 56 is present in a branch 14, the branch entry location is preferably located upstream of the stopcock 56.

The primary advantages of the blind coupling methods are that few, if any, wall penetrations are required, which saves the cost and time of having to remove and replace wall sections. Additionally, fewer riser and branch access fittings are required, as compared to typical installation methods that require a greater number of access points in the gas riser 12 and the branches 14 of the gas pipe system 10 to successfully install fiber optic cable. The blind coupling methods may not be feasible, however, in cases where multiple elbows or bends are located between the gas riser 12 and a branch entry point, since it is extremely difficult, if not impossible, to navigate a translating member through multiple elbows or bends in a branch 14.

In situations where multiple elbows or bends are located between the gas riser 12 and a branch entry point, a "visible" coupling method may be preferred. A visible coupling method is also preferred in situations where it is desirable to minimize the number of fiber optic cables 20 present in the gas riser 12, which 15 maximizes gas flow capacity in the riser 12. Using a visible coupling method, a main fiber optic cable 20 in the gas riser 12 can be spliced or otherwise coupled to branch fiber optic cables 20', so that only a single fiber optic cable 20 nee be present in the gas riser 12, as described below.

The visible coupling method is performed after the entire gas pipe system 10, or a particular span being worked on, is de-pressurized. The significant differences when performing the visible coupling method, as compared to the blind coupling methods described above, are as follows: the main fiber optic cable 20 is directly accessed and extracted at the gas riser 12, and a riser fitting is installed at each of these access points (typically one per building floor); a fiber from the multifiber main fiber optic cable 20 is spliced or otherwise coupled to a branch fiber optic cable 20' that is routed through a branch 14 to an end-user location; and, an additional branch fitting 54 is installed in the branch 14 to provide a branch exit location for the branch fiber optic cable 20'.

Figure 16:
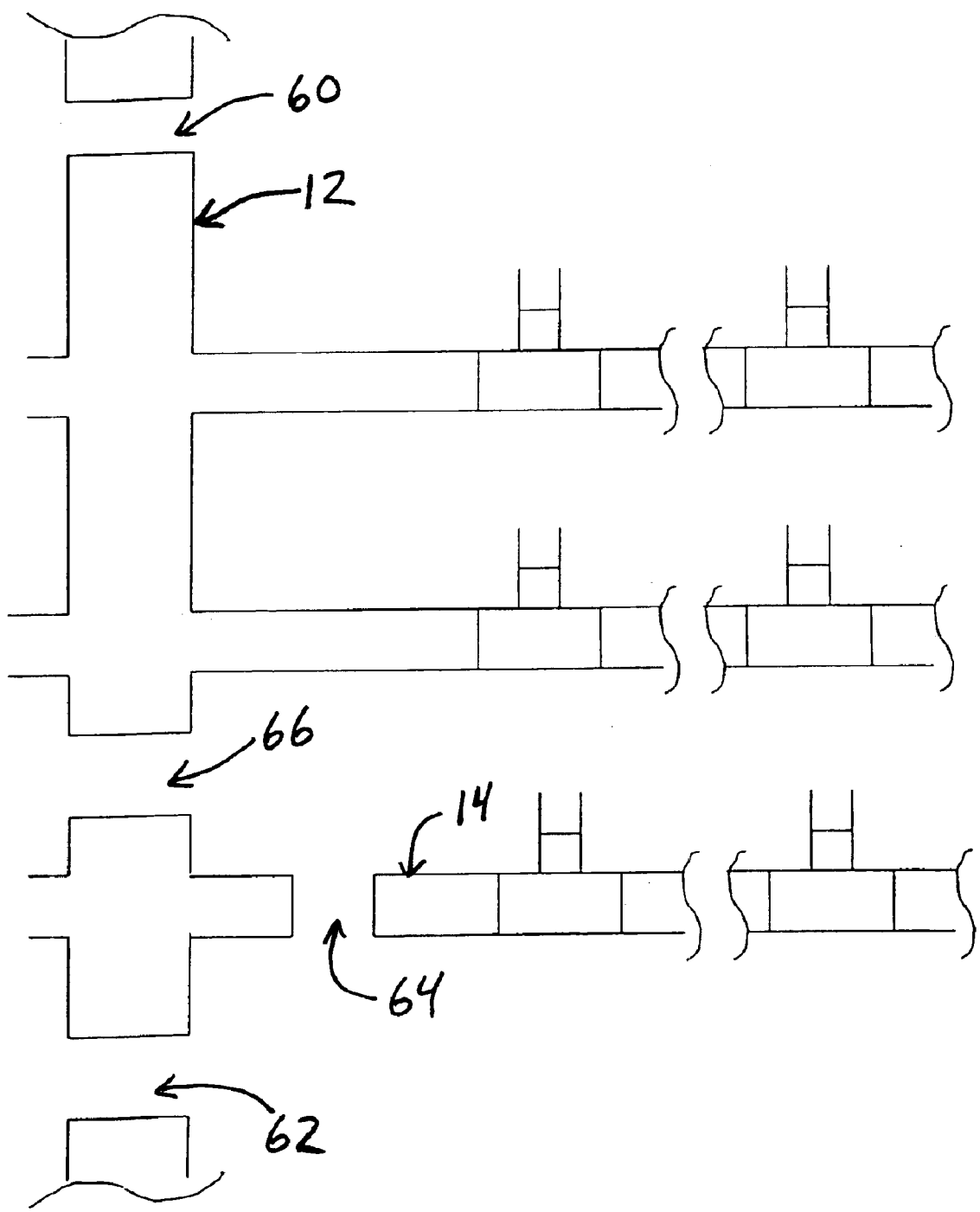
FIGS. 16–26 illustrate steps for installing a fiber optic cable in the gas pipe system shown in FIG. 1, according to a visible coupling method.

FIGS. 16–26 illustrate steps for installing one or more fiber optic cables in the gas pipe system 10 of a building 5, according to the visible coupling method. First, the riser 12 and branch 14 sections intended for installation (or the entire gas pipe system 10) are de-pressurized. Access points are then cut into the gas riser 12 10 and at least one branch 14 at a riser entry location 60, a first riser exit location 62, a branch exit location 64, and a second riser exit location 66 (as well as any other locations where access is desired), as shown in FIG. 16.

Figure 17:
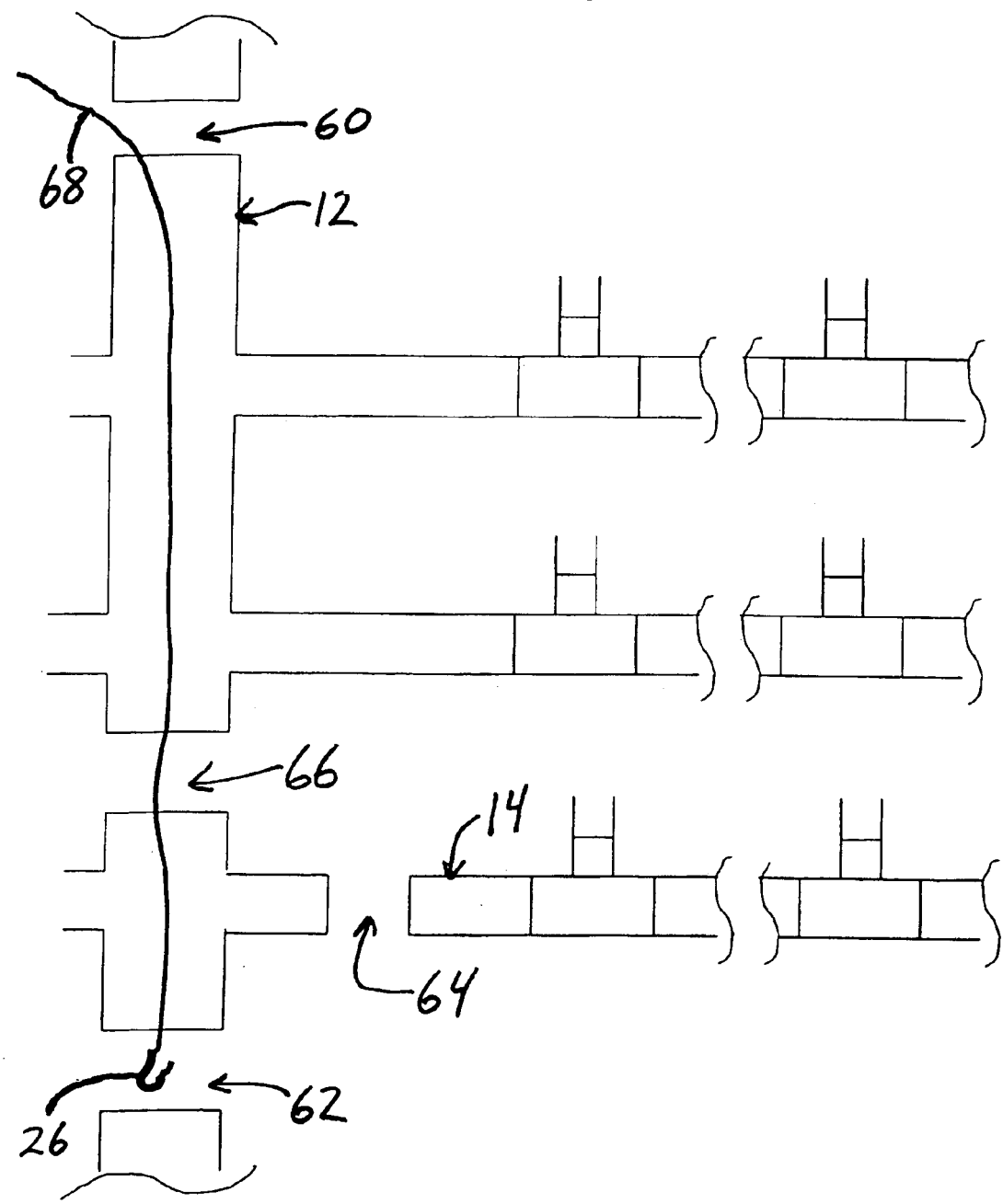
Figure 18:
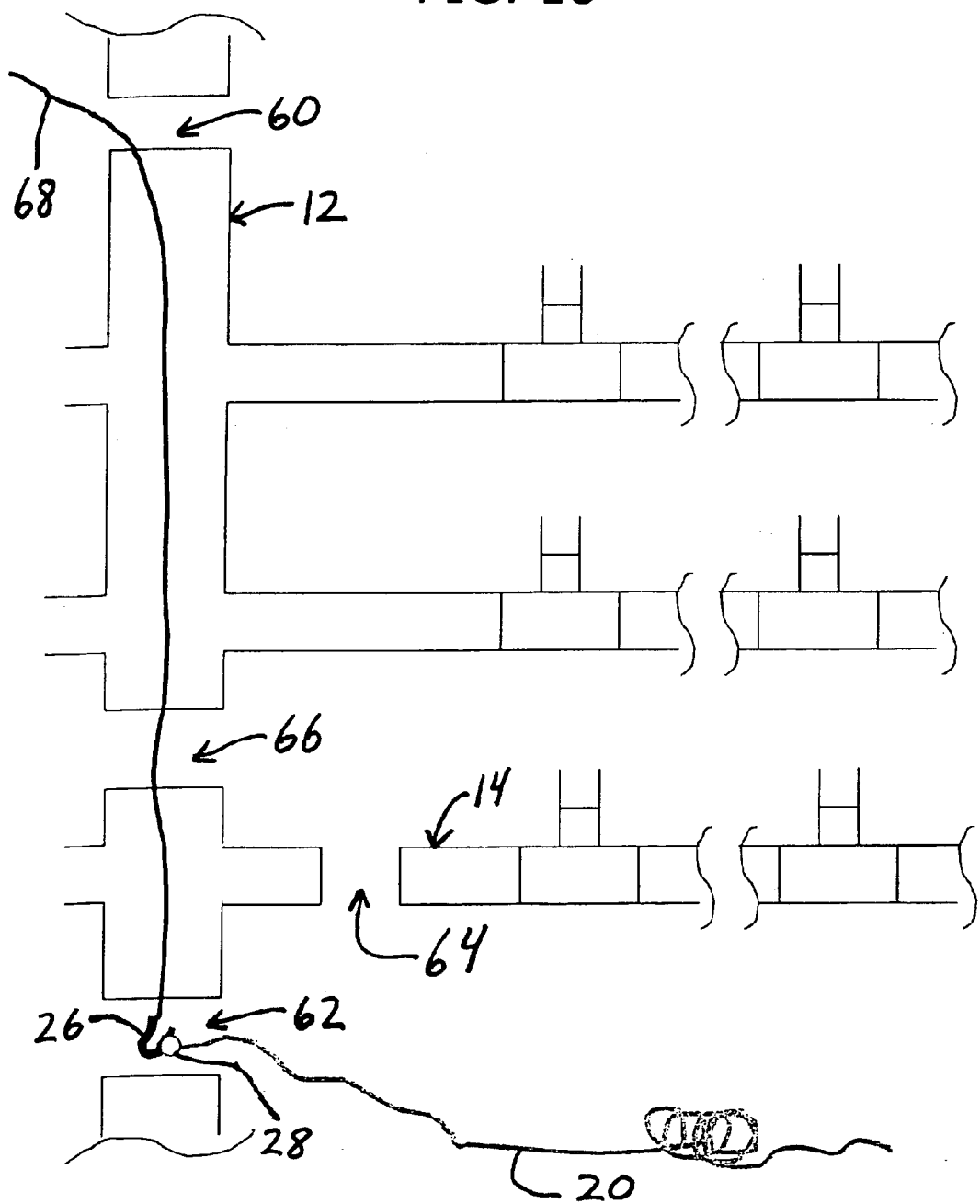
Figure 19:
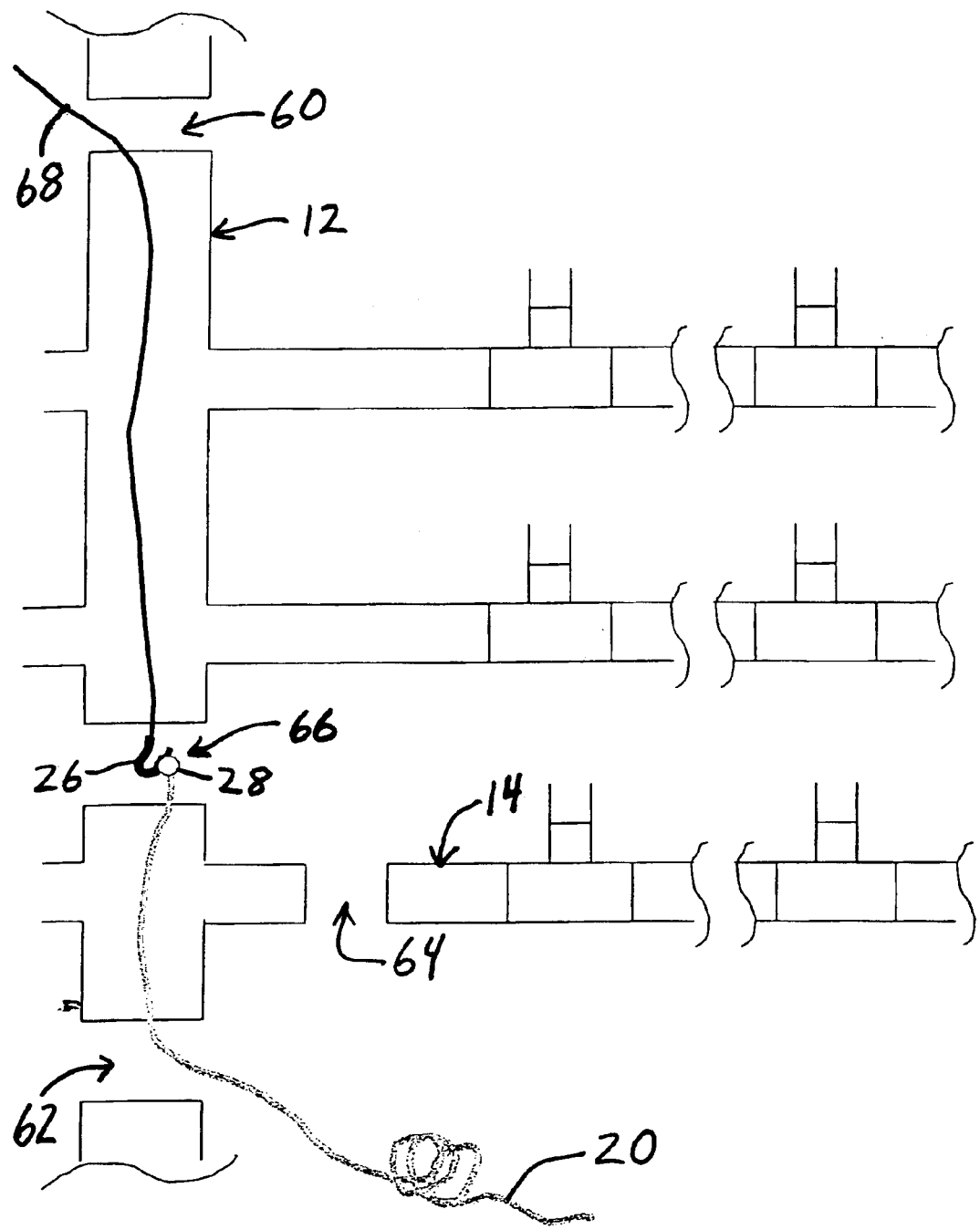

A first translating member 68 is routed from the riser entry location 60, through the riser 12, and out the first riser exit location 62, as shown in FIG. 17. A grasping hook 26, or other engagement means, on the first translating member 68 engages a hook ring 28 on a main fiber optic cable 20, which is preferably located near the first riser exit location 62, as shown in FIG. 18. The first translating member 68, along with the main fiber optic cable 20, is then retracted into the gas riser 12 and out the second riser exit location 66, as shown in FIG. 19.

Figure 20:
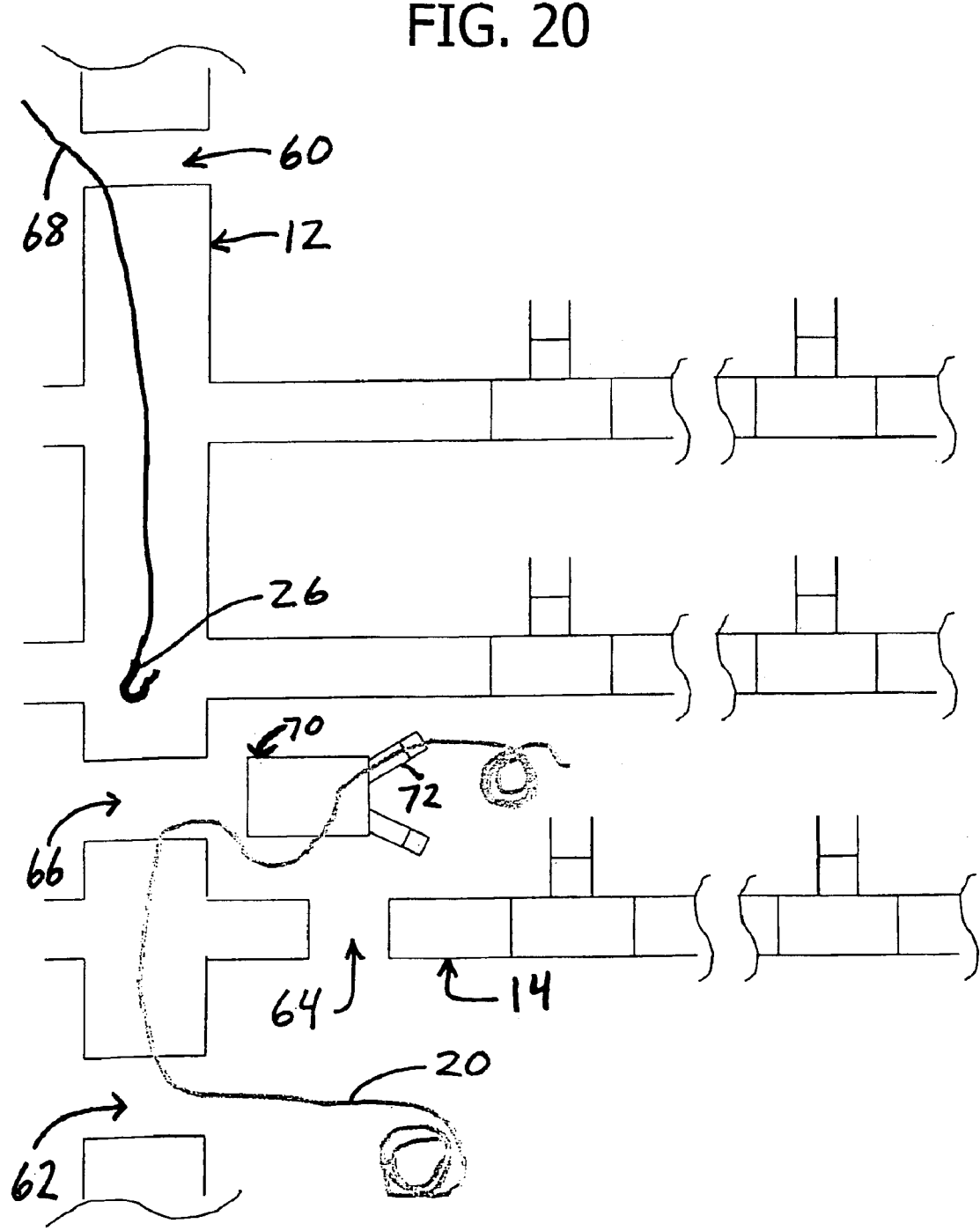
Figure 21:
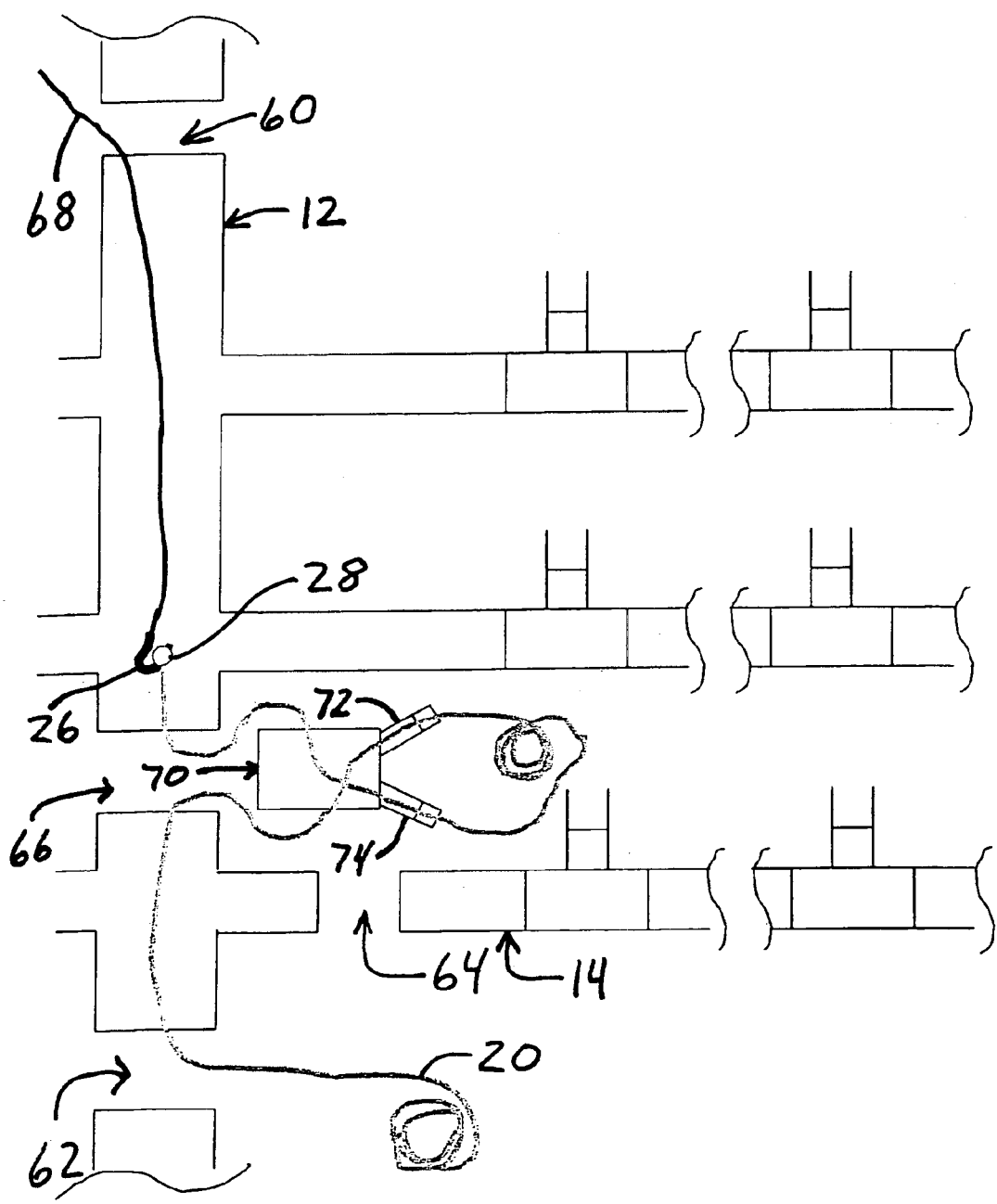

At this point, the main fiber optic cable 20 is detached from the first translating member 68, and is pulled or otherwise routed through a sealed first port 72 in a riser fitting 70, as shown in FIG. 20. The main fiber optic cable 20 is then pulled or otherwise routed through a sealed second port 74 in the riser fitting 70, as shown in FIG. 21, such that a section of the main fiber optic cable 20 remains outside of the gas riser 12 and the gas riser fitting 70. The hook ring 28 on the main fiber optic cable 20 is then re-attached to the grasping hook 26 on the first translating member 68, which is positioned in the gas riser 12 above the second riser exit location 66, as shown in FIG. 21, so that the main fiber optic cable 20 may be routed to other floors in the building 5.

Figure 22:
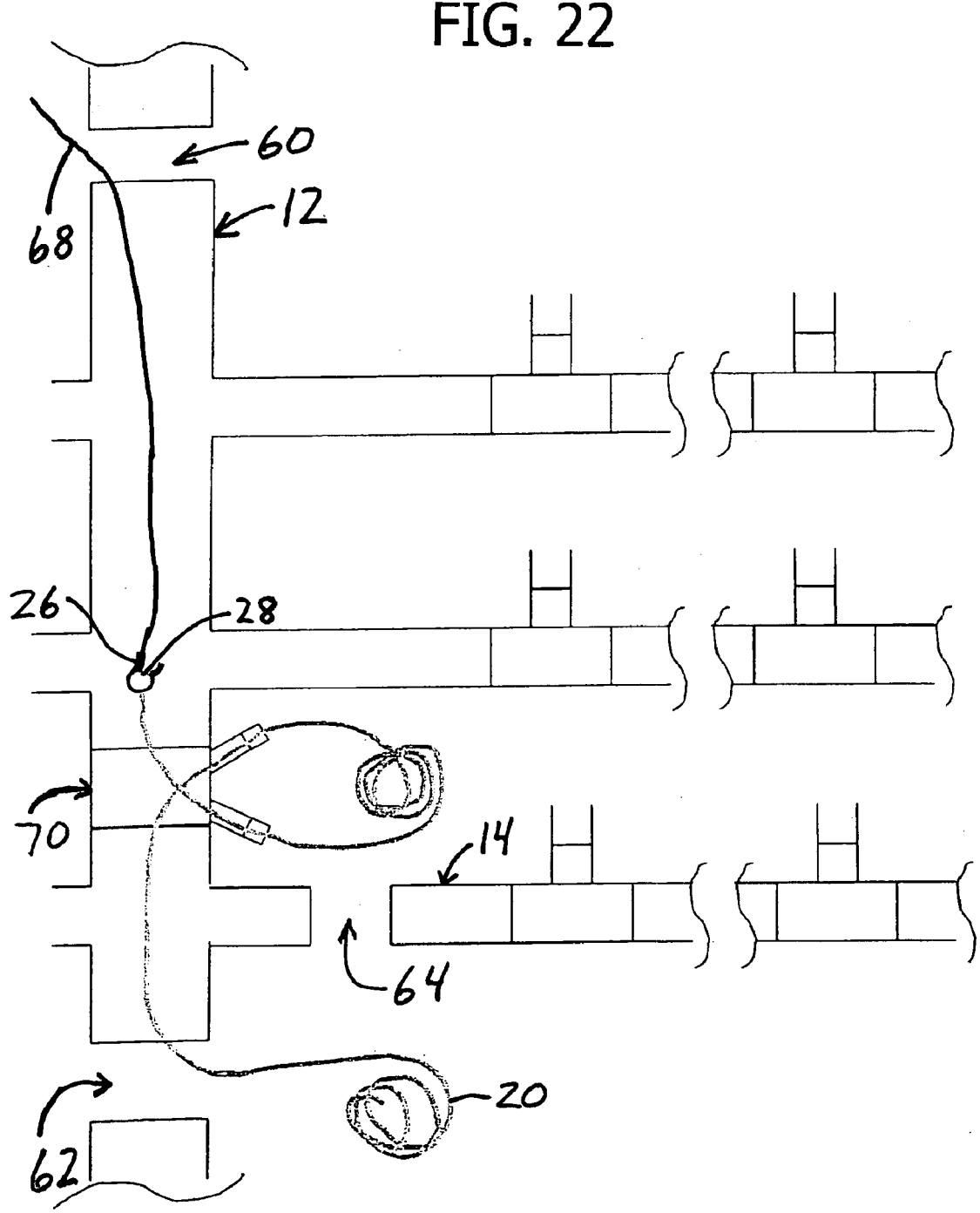

As illustrated in FIG. 22, the riser fitting 70 is then attached to the gas riser 12 at the second riser exit location 66, via welding or another suitable attachment method, so that no openings remain in the gas riser 12 at that location.

Figure 23:
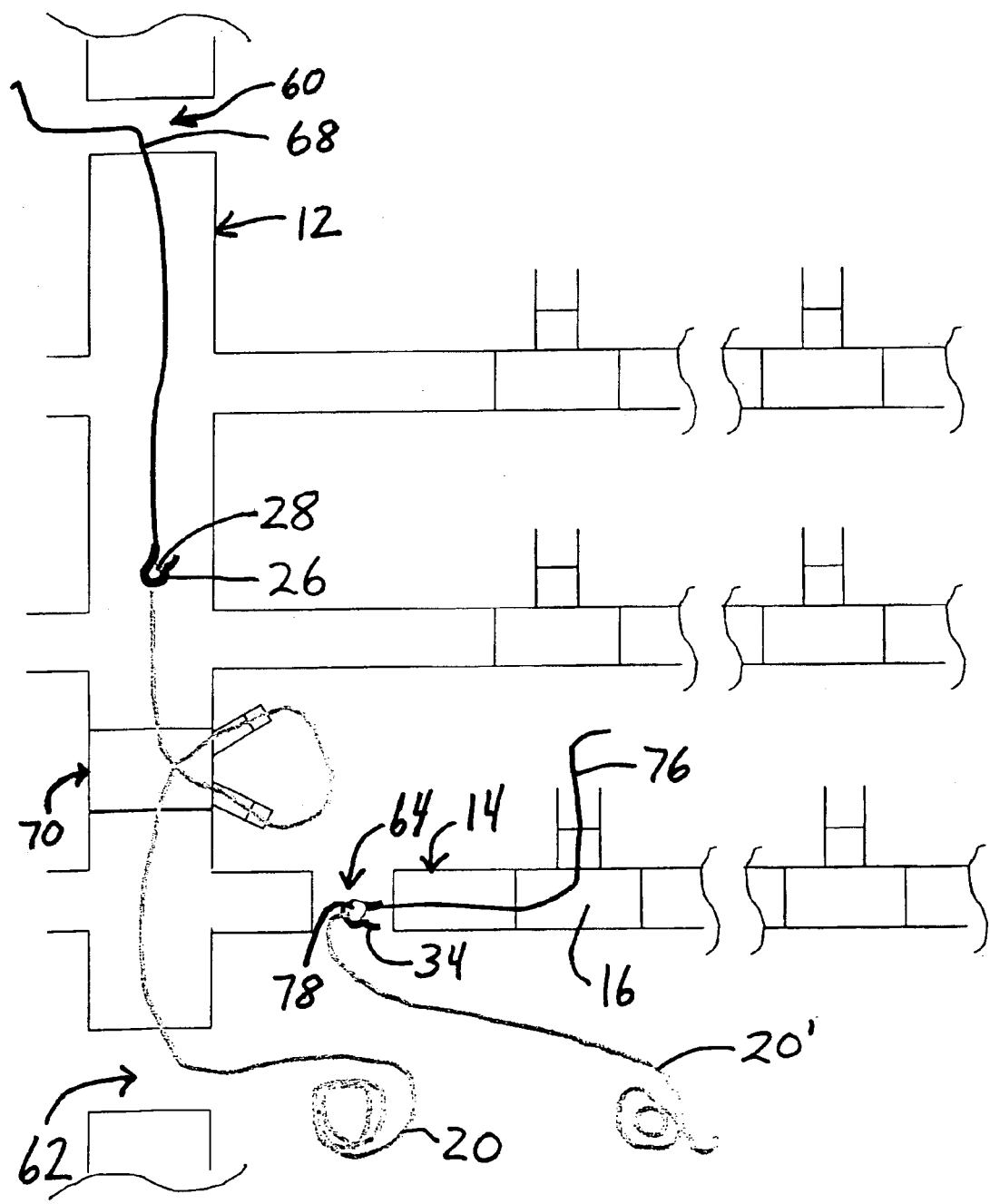

A second translating member 76 is then routed from a branch entry location, through any branch elbows 16 and the branch 14, and out the branch exit location 64, as shown in FIG. 23. At this point, a grasping hook 34, or other engagement means, on the second translating member 76 engages a hook ring 78, or other retainer fitting, on a first end of a branch fiber optic cable 20' located at or near the branch exit location 64, as shown in FIG. 23.

Figure 24:
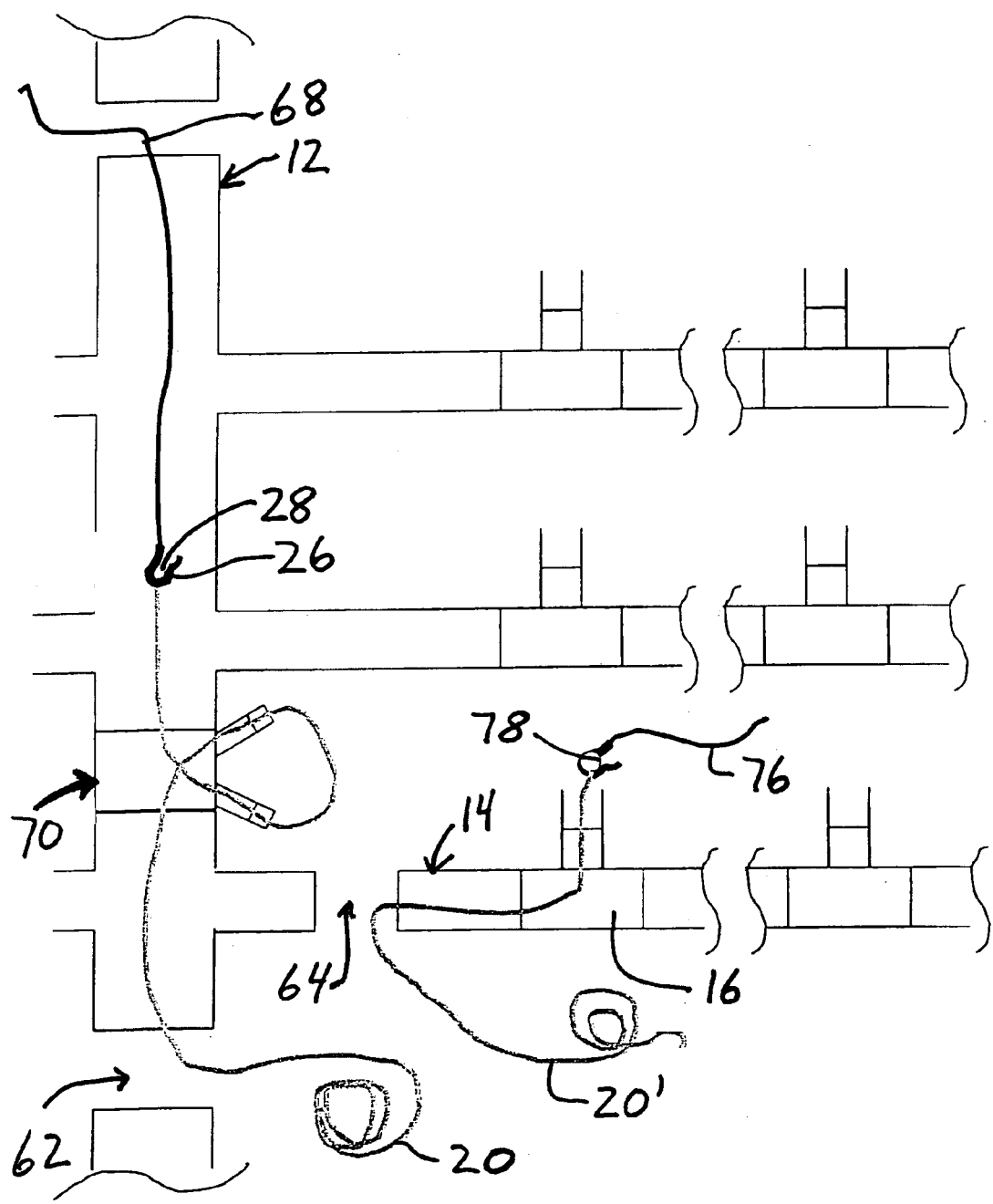
Figure 25:
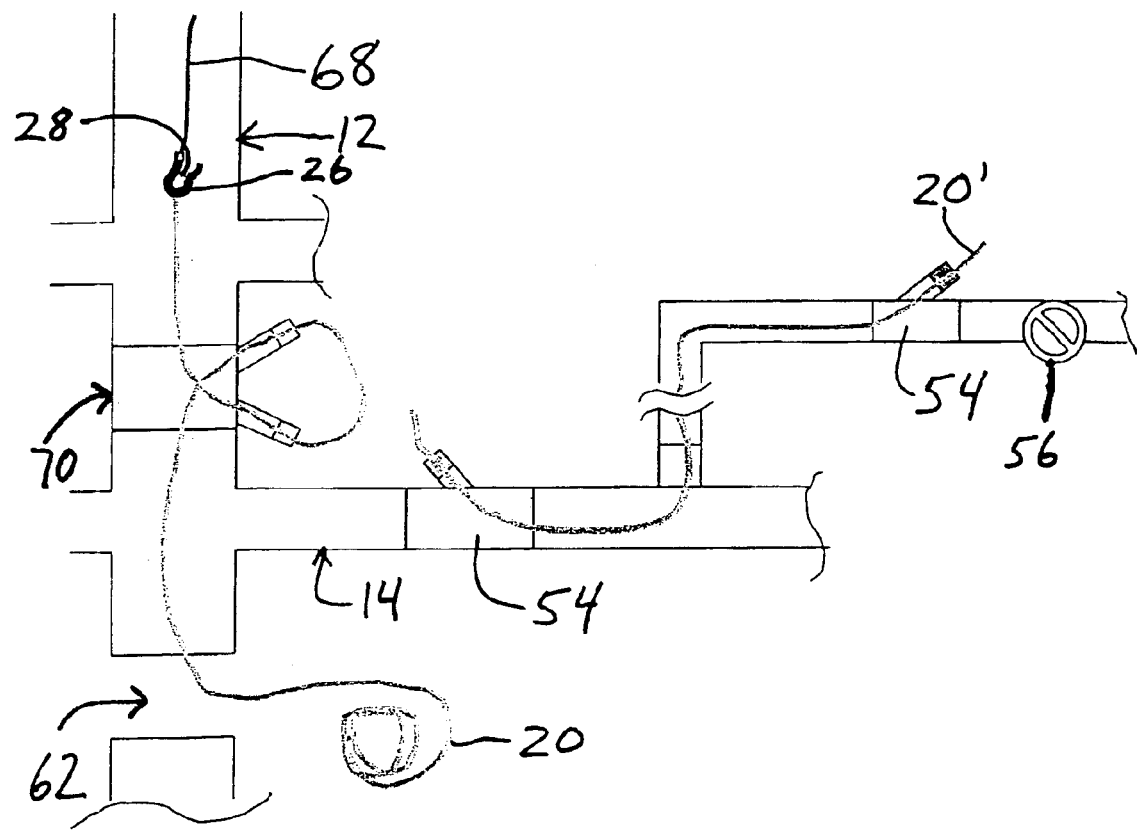

The second translating member 76 is then retracted, along with the first end of the branch fiber optic cable 20', through the branch 14, including any branch elbows 16, and out the branch entry location, as shown in. FIG. 24. Fiber cable branch fittings 54 are installed at the branch entry location and the branch exit location 64, as shown in FIG. 25, via welding or another suitable attachment method.

The branch fiber optic cable 20' is preferably sealed to the fiber cable branch fittings 54 so that gas does not escape from the gas pipe system 10 at these locations. A stopcock 56 may be located in the branch 14 to regulate or stop the flow of gas through the branch 14. If such a stopcock 56 is present in the branch 14, the branch entry location is preferably located upstream of the stopcock 56.

Figure 26:
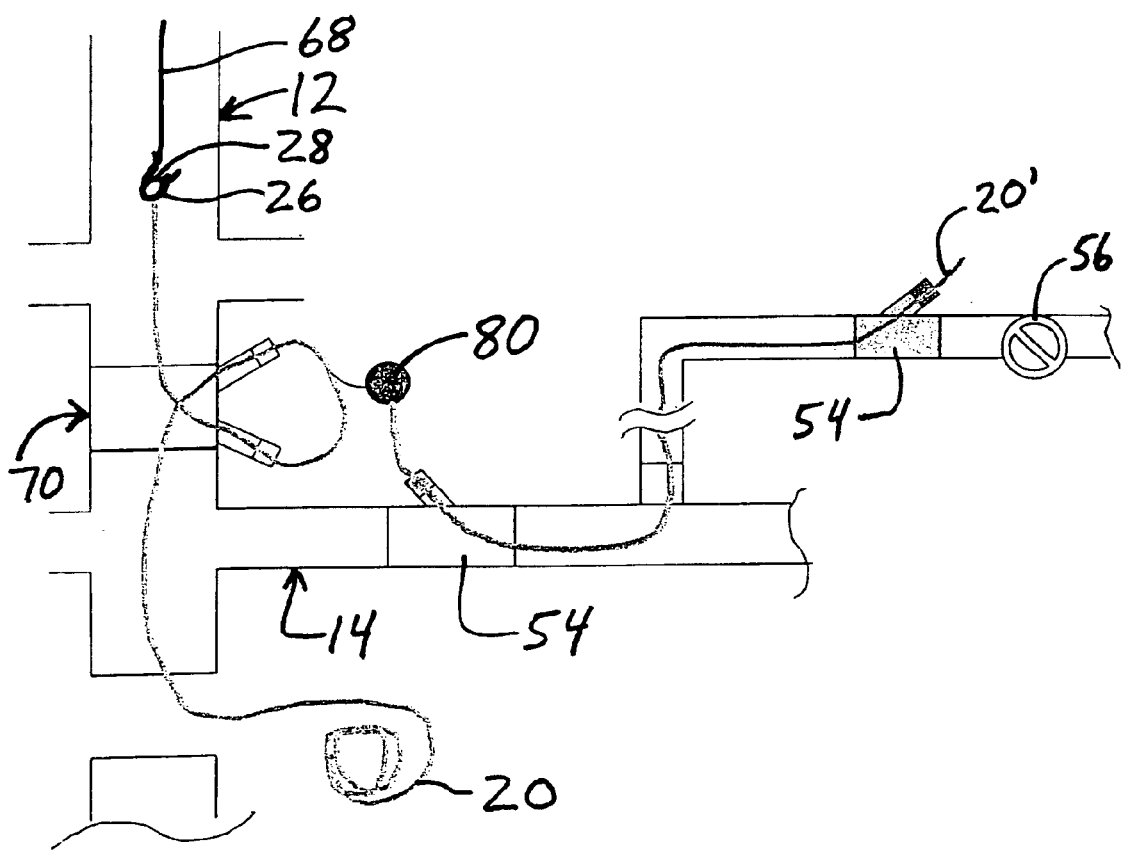

A second end of the branch fiber optic cable 20' is then spliced or otherwise coupled to one or more fibers of the section of the main fiber optic cable 20 remaining outside of the riser fitting 70, as shown in FIG. 26. An optical splitter 80 may be used to couple the branch fiber optic cable 20' to the main fiber optic cable 20, or the fiber optic cables 20, 20' may be spliced or otherwise coupled together in any other suitable manner. The first end of the branch fiber optic cable 20' may then be connected to an end-user system, such as a computer system.

Additional branch fiber optic cables 20' may be routed along other branches 14 on the same floor of the building 5, to end-user locations, and may be spliced or otherwise coupled to the main fiber optic cable 20 in a similar manner. Similar steps may then be performed on additional floors of the building 5 to connect branch fiber optic cables 20' in branches 14 on the additional floors to the main fiber optic cable 20. When the last of the branch fiber optical cables 20' has been installed, any remaining openings in the gas riser 12 and/or the branches 14 are closed and sealed to prevent gas from escaping from the gas pipe system 10.

Many factors should be considered when choosing which of the disclosed methods to use for installing fiber optic cable in a building. Some of these factors include the following:

the number of floors covered by an unobstructed riser length;

the length of time that any customer may be without gas service (and what is acceptable to the building owner);

the installation crew resources available;

the building wall restoration costs;

the number of wall penetrations allowed by the building owner;

available riser and branch capacity (the blind coupling methods require more riser space, due to the higher number of fiber optic cables required, whereas the visible coupling method typically requires only a single fiber optic cable in the riser); and the optical fiber architecture chosen.

While any suitable optical fiber architecture may be installed in a building, a passive optical network (PON) is preferred. PON technology generally refers to telecommunication systems that use only optical components between a head-end optical line terminal (OLT), and an optical network terminal (ONT) located at a customer site. PON systems typically allow a single optical fiber to be "split" to serve up to 32 different customers, although greater numbers could be served if more fibers were present in the main fiber optic cable. PON technology is particularly cost-effective for buildings with a large number of users, and is easily scaleable to serve future needs. A PON architecture also allows for the use of as few as one fiber optic cable in a gas riser. Alternatively, a conventional switch/router architecture, or any other suitable architecture, may be used. If a switch/router architecture is used, multiple fiber optic cables in the gas riser are typically required.

If the gas riser in a building has a large enough capacity, innerduct may be installed in the gas riser, after which the fiber optic cables may be installed within the innerduct. The innerduct provides an additional level of protection for the optical fibers in the fiber optic cable. Suitable systems and methods for installing innerduct in gas pipes are described in U.S. Pat. Nos. 6,691,728 and 6,691,734, incorporated herein by reference. In situations where the gas riser capacity is too small to allow for the use of innerduct, or where installing innerduct is otherwise undesirable, the fiber optic cables are directly inserted into the gas lines.

Thus, while several embodiments have been shown and described, various changes and substitutions may of course be made, without departing from the spirit and scope of the invention. For example, the order of the steps of the various methods described above may be altered when practicable, without departing from the scope of the invention. The methods described above may also be used in other building pipeline systems, such as water or sewage pipelines. They also alternatively be used in ventilation ducts. The invention, therefore, should not be limited, except by the following claims and their equivalents.

What is claimed is:

1. A method for installing a fiber optic cable in a building having a gas riser, comprising the steps of:

routing a first translating member from a riser entry location, through the riser, and out a riser exit location;

engaging a fiber optic cable near the riser exit location with the first translating member;

retracting the first translating member, along with the fiber optic cable, into the riser past a branch in the riser, so that the fiber optic cable hangs down past the branch;

routing a second translating member from a branch entry location, through the branch, and into the riser;

engaging the fiber optic cable with the second translating member;

disengaging the first translating member from the fiber optic cable; and retracting the second translating member, along with the fiber optic cable, through the branch and out the branch entry location.

2. The method of claim 1 further comprising the step of connecting the fiber optic cable to an end-user system after retracting the fiber optic cable out the branch entry location.

3. The method of claim 1 wherein the steps of engaging the fiber optic cable with the first and second translating members comprise hooking the fiber optic cable with hooks on the first and second translating members.

4. The method of claim 1 wherein the steps of engaging the fiber optic cable with the first and second translating members comprise engaging a retainer fitting on an end of the fiber optic cable with engagement means on the first and second translating members.

5. The method of claim 1 further comprising the step of providing a seal at each of the riser entry point, the riser exit location, and the branch entry location, to facilitate installation of the fiber optic cable while the gas riser and the branch are pressurized.

6. The method of claim 1 further comprising the step of depressurizing the riser and the branch before routing the first translating member through the riser.

7. The method of claim 1 further comprising repeating the steps for installing a fiber optic cable for one or more additional fiber optic cables at one or more additional branches.

8. The method of claim 1 further comprising repeating the steps for installing a fiber optic cable to install fiber optic cables on more than one floor of the building.

9. A method for installing a fiber optic cable in a building having a gas riser, comprising the steps of:
lowering a weighted first end of a fiber optic cable from a riser entry location, through the riser, past a branch in the riser, and out a riser exit location;
routing a translating member from a branch entry location, through the branch, and into the riser;
engaging the fiber optic cable with the translating member; and
retracting the translating member, along with the fiber optic cable, through the branch and out the branch entry location.

10. The method of claim 9 further comprising the steps of:
releasing a second end of the fiber optic cable into the riser after the fiber optic cable is engaged by the translating member; and
pulling the fiber optic cable toward the riser exit location until a retainer fitting on the second end of the fiber optic cable is engaged by the translating member.

11. The method of claim 9 further comprising the step of connecting the fiber optic cable to an end-user system after retracting the fiber optic cable out the branch entry location.

12. The method of claim 9 wherein the step of engaging the fiber optic cable comprises hooking the fiber optic cable with a hook on the translating member.

13. The method of claim 9 further comprising the step of providing a seal at each of the riser entry location, the riser exit location, and the branch entry location, to facilitate installation of the fiber optic cable while the gas riser and the branch are pressurized.

14. The method of claim 9 further comprising the step of depressurizing the riser and the branch before lowering the fiber optic cable into the riser.

15. The method of claim 9 further comprising repeating the steps for installing a fiber optic cable for one or more additional fiber optic cables at one or more additional branches.

16. The method of claim 9 further comprising repeating the steps for installing a fiber optic cable to install fiber optic cables on more than one floor of the building.

17. A method for installing fiber optic cable in a building having a gas riser, comprising the steps of:
depressurizing a section of the riser;
cutting a plurality of access points into the depressurized section of the riser and at least one branch of the riser;
routing a first translating member from a first access point in the riser, through the riser, and out a second access point in the riser;
attaching a main fiber optic cable to the first translating member;
retracting the first translating member, along with the main fiber optic cable, through the riser and out a third access point in the riser;
detaching the main fiber optic cable from the first translating member;
routing the main fiber optic cable through a riser fitting and back into the riser, such that a section of the main fiber optic cable remains outside of the riser;
connecting the riser fitting to the riser at the third access point;
routing a second translating member from a fourth access point in a branch of the riser, through the branch, and out a fifth access point in the branch;
attaching a branch fiber optic cable to the second translating member;
retracting the second translating member, along with a first end of the branch fiber optic cable, through the branch and out the fourth access point; and
coupling a second end of the branch fiber optic cable to the section of the main fiber optic cable remaining outside of the riser.

18. The method of claim 17 further comprising the step of connecting the first end of the branch fiber optic cable to an end-user system.

19. The method of claim 17 further comprising repeating the steps for installing fiber optic cable for one or more additional branch fiber optic cables at one or more additional branches.

20. The method of claim 17 further comprising repeating the steps for installing fiber optic cable to install one or more additional branch fiber optic cables on more than one floor of the building.

21. The method of claim 17 further comprising the steps of:
installing a first branch fitting at the fourth access point, and a second branch fitting at the fifth access point; and
sealing the branch fiber optic cable to the first and second branch fittings.

22. The method of claim 17 further comprising the step of reattaching the main fiber optic cable to the first translating member after routing the main fiber optic cable through the riser fitting so that the main fiber optic cable can be further routed through the riser.

23. The method of claim 17 wherein the step of routing the main fiber optic cable through the riser fitting comprises pulling the main fiber optic cable out through a first port in the riser fitting, and then pulling the main fiber optic cable in through a second port in the riser fitting and back into the riser, such that the section of the main fiber optic cable remains outside the riser fitting.

24. A method for installing a fiber optic cable in a building having a gas riser, comprising the steps of:
lowering a first end of a fiber optic cable into the riser and past a branch in the riser;
routing a translating member from a branch entry location, through the branch, and into the riser;
engaging the fiber optic cable with the translating member;
releasing a second end of the fiber optic cable into the riser; and
retracting, via the translating member, the second end of the fiber optic cable through the branch and out the branch entry location.

25. The method of claim 24 wherein the lowering step further includes lowering the first end of the fiber optic cable out a riser exit location, wherein the first end of the fiber optic cable remains outside of the riser while the second end of the fiber optic cable is retracted through the branch and out the branch entry location.

* * * * *